(12) United States Patent
Edery et al.

(10) Patent No.: US 7,647,633 B2
(45) Date of Patent: *Jan. 12, 2010

(54) MALICIOUS MOBILE CODE RUNTIME MONITORING SYSTEM AND METHODS

(75) Inventors: Yigal Mordechai Edery, Pardesia (IL); Nimrod Itzhak Vered, Goosh Tai-Mond (IL); David R. Kroll, San Jose, CA (US); Shlomo Touboul, Kefar-Haim (IL)

(73) Assignee: Finjan Software, Ltd., Netanya (IL)

( * ) Notice: Subject to any disclaimer, the term of this patent is extended or adjusted under 35 U.S.C. 154(b) by 917 days.

This patent is subject to a terminal disclaimer.

(21) Appl. No.: 11/159,455

(22) Filed: Jun. 22, 2005

(65) Prior Publication Data

US 2006/0026677 A1 Feb. 2, 2006

Related U.S. Application Data

(63) Continuation of application No. 09/861,229, filed on May 17, 2001, now Pat. No. 7,058,822, and a continuation-in-part of application No. 09/551,302, filed on Apr. 18, 2000, now Pat. No. 6,480,962, and a continuation-in-part of application No. 09/539,667, filed on Mar. 30, 2000, now Pat. No. 6,804,780.

(60) Provisional application No. 60/205,591, filed on May 17, 2000.

(51) Int. Cl.
  *G06F 21/24* (2006.01)
  *G06F 11/30* (2006.01)
  *G06F 15/16* (2006.01)

(52) U.S. Cl. ....................................................... 726/22

(58) Field of Classification Search ........................ None
See application file for complete search history.

(56) References Cited

U.S. PATENT DOCUMENTS 5,077,677 A 12/1991 Murphy et al. ................ 706/62

(Continued)

FOREIGN PATENT DOCUMENTS

EP 1091276 4/2001
EP 1132796 9/2001

OTHER PUBLICATIONS

Zhong, et al., "Security in the Large: is Java's Sandbox Scalable?," *Seventh IEEE Symposium on Reliable Distributed Systems*, pp. 1-6, Oct., 1998.

(Continued)

*Primary Examiner*—Christopher A Revak
(74) *Attorney, Agent, or Firm*—King & Spalding LLP

(57) ABSTRACT

Protection systems and methods provide for protecting one or more personal computers ("PCs") and/or other intermittently or persistently network accessible devices or processes from undesirable or otherwise malicious operations of Java™ applets, ActiveX™ controls, JavaScript™ scripts, Visual Basic scripts, add-ins, downloaded/uploaded programs or other "Downloadables" or "mobile code" in whole or part. A protection engine embodiment provides, within a server, firewall or other suitable "re-communicator," for monitoring information received by the communicator, determining whether received information does or is likely to include executable code, and if so, causes mobile protection code (MPC) to be transferred to and rendered operable within a destination device of the received information, more suitably by forming a protection agent including the MPC, protection policies and a detected-Downloadable. An MPC embodiment further provides, within a Downloadable-destination, for initiating the Downloadable, enabling malicious Downloadable operation attempts to be received by the MPC, and causing (predetermined) corresponding operations to be executed in response to the attempts, more suitably in conjunction with protection policies.

41 Claims, 10 Drawing Sheets

U.S. PATENT DOCUMENTS

| | | | |
|---|---|---|---|
| 5,359,659 A | 10/1994 | Rosenthal | 726/24 |
| 5,361,359 A | 11/1994 | Tajalli et al. | 726/23 |
| 5,414,833 A | 5/1995 | Hershey et al. | 726/22 |
| 5,485,409 A | 1/1996 | Gupta et al. | 726/25 |
| 5,485,575 A | 1/1996 | Chess et al. | 714/38 |
| 5,572,643 A | 11/1996 | Judson | 709/249 |
| 5,579,509 A | 11/1996 | Furtney et al. | 703/27 |
| 5,606,668 A * | 2/1997 | Shwed | 726/13 |
| 5,623,600 A * | 4/1997 | Ji et al. | 726/24 |
| 5,638,446 A | 6/1997 | Rubin | 705/51 |
| 5,675,711 A | 10/1997 | Kephart et al. | 706/12 |
| 5,692,047 A | 11/1997 | McManis | 713/167 |
| 5,692,124 A | 11/1997 | Holden et al. | 726/2 |
| 5,720,033 A | 2/1998 | Deo | 726/2 |
| 5,724,425 A | 3/1998 | Chang et al. | 705/52 |
| 5,740,248 A | 4/1998 | Fieres et al. | 713/156 |
| 5,740,441 A | 4/1998 | Yellin et al. | 717/134 |
| 5,761,421 A | 6/1998 | van Hoff et al. | 709/223 |
| 5,765,205 A | 6/1998 | Breslau et al. | 711/203 |
| 5,784,459 A | 7/1998 | Devarakonda et al. | 713/165 |
| 5,796,952 A | 8/1998 | Davis et al. | 709/224 |
| 5,805,829 A | 9/1998 | Cohen et al. | 709/202 |
| 5,832,208 A | 11/1998 | Chen et al. | 726/24 |
| 5,832,274 A | 11/1998 | Cutler et al. | 717/171 |
| 5,850,559 A | 12/1998 | Angelo et al. | 713/320 |
| 5,859,966 A | 1/1999 | Hayman et al. | 726/23 |
| 5,864,683 A | 1/1999 | Boebert et al. | 709/249 |
| 5,881,151 A | 3/1999 | Yamamoto | 726/24 |
| 5,884,033 A | 3/1999 | Duvall et al. | 709/206 |
| 5,892,904 A | 4/1999 | Atkinson et al. | 726/22 |
| 5,951,698 A | 9/1999 | Chen et al. | 714/38 |
| 5,956,481 A | 9/1999 | Walsh et al. | 726/23 |
| 5,963,742 A | 10/1999 | Williams | 717/143 |
| 5,974,549 A * | 10/1999 | Golan | 726/23 |
| 5,978,484 A | 11/1999 | Apperson et al. | 705/54 |
| 5,983,348 A * | 11/1999 | Ji | 726/13 |
| 5,987,611 A | 11/1999 | Freund | 726/4 |
| 6,088,801 A | 7/2000 | Grecsek | 726/1 |
| 6,088,803 A | 7/2000 | Tso et al. | 726/22 |
| 6,092,194 A * | 7/2000 | Touboul | 726/24 |
| 6,154,844 A * | 11/2000 | Touboul et al. | 726/24 |
| 6,167,520 A * | 12/2000 | Touboul | 726/23 |
| 6,339,829 B1 | 1/2002 | Beadle et al. | 726/15 |
| 6,425,058 B1 | 7/2002 | Arimilli et al. | 711/134 |
| 6,434,668 B1 | 8/2002 | Arimilli et al. | 711/128 |
| 6,434,669 B1 | 8/2002 | Arimilli et al. | 711/128 |
| 6,480,962 B1 * | 11/2002 | Touboul | 726/22 |
| 6,487,666 B1 | 11/2002 | Shanklin et al. | 726/23 |
| 6,519,679 B2 | 2/2003 | Devireddy et al. | 711/114 |
| 6,598,033 B2 | 7/2003 | Ross et al. | 706/46 |
| 6,732,179 B1 * | 5/2004 | Brown et al. | 709/229 |
| 6,804,780 B1 * | 10/2004 | Touboul | 713/181 |
| 6,917,953 B2 | 7/2005 | Simon et al. | 707/204 |
| 7,058,822 B2 * | 6/2006 | Edery et al. | 726/22 |
| 7,210,041 B1 | 4/2007 | Gryaznov et al. | 713/188 |
| 7,343,604 B2 | 3/2008 | Grabarnik et al. | 719/313 |
| 7,418,731 B2 | 8/2008 | Touboul | 726/22 |
| 2004/0073811 A1 | 4/2004 | Sanin | 726/13 |
| 2004/0088425 A1 | 5/2004 | Rubinstein et al. | 709/230 |
| 2005/0172338 A1 | 8/2005 | Sandu et al. | 726/22 |
| 2006/0031207 A1 | 2/2006 | Bjarnestam et al. | 707/3 |

OTHER PUBLICATIONS

Rubin, et al., "Mobile Code Security," *IEEE Internet*, pp. 30-34, Dec., 1998.

Schmid, et al. "Protecting Data From Malicious Software," *Proceeding of the 18th Annual Computer Security Applications Conference*, pp. 1-10, 2002.

Corradi, et al., "A Flexible Access Control Service for Java Mobile Code," *IEEE*, pp. 356-365, 2000.

International Search Report for Application No. PCT/IB97/01626, 3 pp., May 14, 1998 (mailing date).

International Search Report for Application No. PCT/IL05/00915, 4 pp., March 3, 2006.

Written Opinion for Application N0. PCT/IL05/00915, 5 pp., Mar. 3, 2006 (mailing date).

International Search Report for Application No. PCT/IB01/01138, 44 pp., Sep. 20, 2002 (mailing date).

International Preliminary Examination Report for Application No. PCT/IB01/01138, 2 pp., dated Dec. 19, 2002.

Gerzic, Amer, "Write Your Own Regular Expression Parser," Nov. 17, 2003, 18 pp.,.

Power, James, "Lexical Analysis," 4 pp., May 14, 2006, Retrieved from the Internet:.

Sitaker, Kragen "Rapid Genetic Evolution of Regular Expression" [online], *The Mial Archive*, Apr. 24, 2004 (retrieved on Dec. 7, 2004), 5 pp.,.

"Lexical Analysis: DFA Minimization & Wrap Up" [online], Fall, 2004 [retrieved on Mar. 2, 2005], 8 pp.,.

"Minimization of DFA" [online], [retrieved on Dec. 7, 2004], 7 pp., Retrieved from the Internet:

"Algorithm: NFS -> DFA" [online], Copyright 1999-2001 [retrieved on Dec. 7, 2004], 4 pp.,.

"CS 3813: Introduction to Formal Languages and Automata - State Minimization and Other Algorithms for Finite Automata," [retrieved on May 11, 2003], 38 pp.

Watson, Bruce W., "Constructing Minimal Acyclic Deterministic Finite Automata," [retrieved on Mar. 20, 2005], 38 pp.

Chang, Chia-Hsiang, "From Regular Expression to DFA's Using Compressed NFA's," Oct., 1992, 243 pp.

"Products," Articles published on the Internet, "Reviltutionary Security for a New Computing Paradigm" regarding SurfinGate™, 7 pp. no date provided.

"Release Notes for the Microsoft, ActiveX Development Kit," Aug. 13, 1996, activex.adsp.or.jp/inetsdk/readme.txt, pp. 1-10.

Doyle et al., "Microsoft Press Computer Dictionary," Microsoft Press, 2d Edition, pp. 137-138, 1993.

Finjan Software Ltd., "Powerful PC Security for the New World of Java™ and Downloadables, SurfinShield™" Article published on the Internet by Finjan Software Ltd., 2 pp. 1996.

Finjan Sofrtware Ltd., "Finjan Announces as Personal Java™ Firewall for Web Browsers - The SurfinShield™ 1.6 (formerly known as SurfinBoard)," Press Release of Finjan Releses SurfinShield 1.6, pp., Oct. 21, 1996.

Finjan Software Ltd., "Finjan Announces Major Power Boost and New features for SurfinShield™ 2.0," Las Vegas Convention Center/ Pavillion 5 P5551, 3 pp., Nov. 18, 1996.

Finjan Software Ltd., "Finjan Software Releases SurfinBoard, Industry's Fist JAVA Security Product for the World Wide Web," Article published on the Internet by Finjan Software Ltd., 1p., Jul. 29, 1996.

Finjan Software Ltd., "Java Security: Issues & Solutions," Article published on the Internet by Finjan Software Ltd., 8 pp. 1996.

Finjan Software Ltd., Company Profile, "Finjan - Safe Surfing, the Java Security Solutions Provider," Article published on the Internet by Finjan Software Ltd., 3 pp., Oct. 31, 1996.

"IBM AntiVirus User's Guide, Version 2.4,", International Business Machines Corporation, pp. 6-7, Nov. 15, 1995.

Khare, R., "Microsoft Authenticode Analyzed" [online], Jul. 22, 1996 [retrieved on Jun. 25, 2003], 2 pp.

LaDue, M., Online Business Consultant: Java Security: Whose Business is It?, Article published on the Internet, Home Page Press, Inc., 4 pp., 1996.

Leach, Norvin, et al., "IE 3.0 Applets Will Earn Certification," *PC Week*, vol. 13, No. 29, 2 pp., Jul. 22, 1996.

Moritz, R., "Why We Shouldn't Fear Java," *Java Report*, pp. 51-56, Feb., 1997.

Microsoft, "Microsoft ActiveX Software Development Kit" [online], Aug. 12, 1996 [retrieved on Jun. 25, 2003], pp. 1-6.

Microsoft® Authenticode Technology, "Ensuring Accountability and Authenticity for Software Components on the Internet,"

Microsoft Corporation, Oct., 1996, including Abstract, Contents, Introduction, and pp. 1-10.

Microsoft Corporation, Web Page Article "Frequently Asked Questions About Authenticode," last updated Feb. 17, 1997, printed Dec. 23, 1998.

Okamoto, E., et al., "ID-Based Authentication System for Computer Virus Detection," IEEE/IEE Electronic Library online, Electronics Letters, vol. 26, Issue 15, ISSN 0013-5194, Jul. 19, 1990, Abstract and pp. 1169-1170.

Omura, J. K., "Novel Applications of Cryptography in Digital Communications," *IEEE Communications Magazine*, pp. 21-29, May, 1990.

Schmitt, D.A., ".EXE files, OS-2 style," *PC Tech Journal*, vol. 6, No. 11, p. 76(13), Nov., 1988.

Zhang, X. N., "Secure Code Distribution," IEEE/IEE Electronic Library online, Computer, vol. 30, Issue 6, pp. 76-79, Jun., 1997.

D. Grune, et al., "Parsing Techniques: A Practical Guide," John Wiley & Sons, Inc., New York, New York, USA, pp. 1-326, 2000.

\* cited by examiner

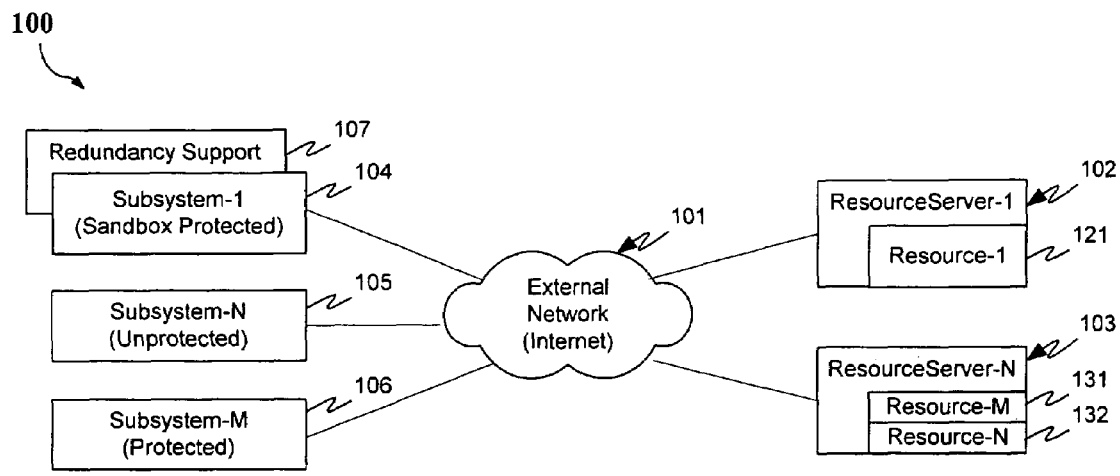
FIG. 1a
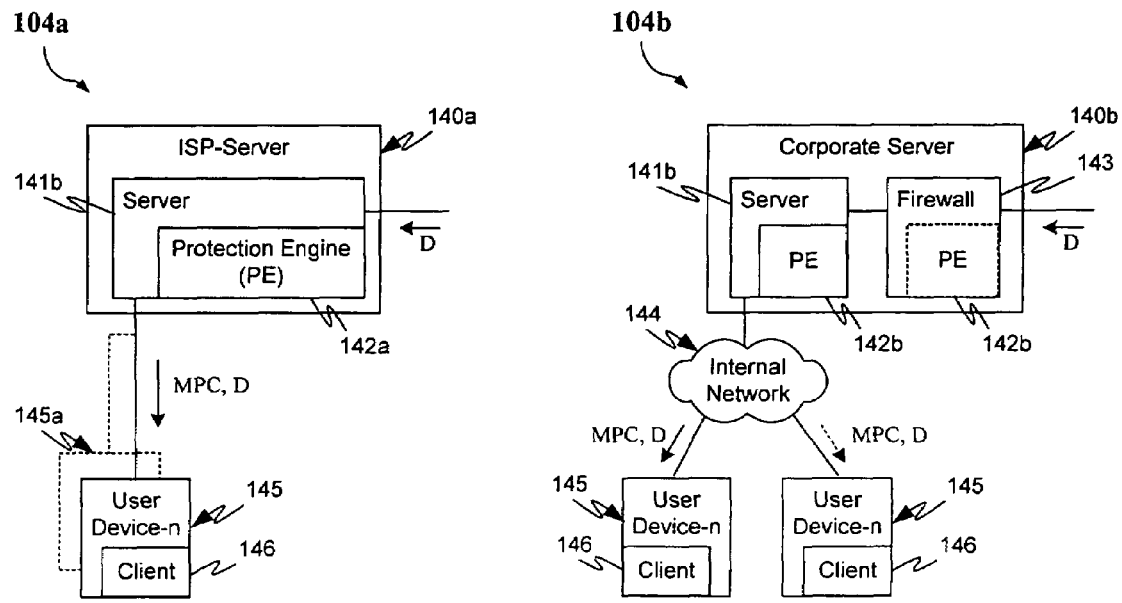
FIG. 1b  FIG. 1c

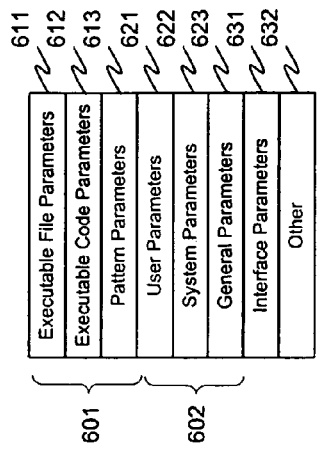
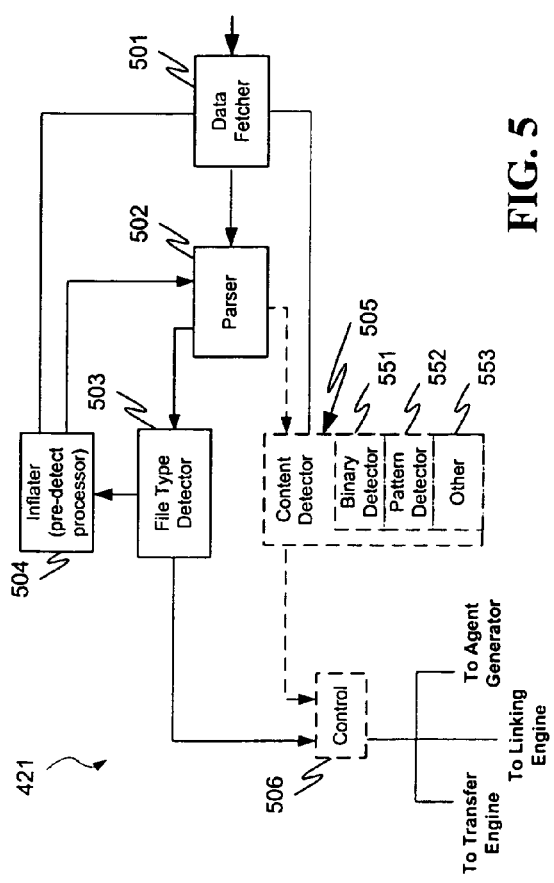
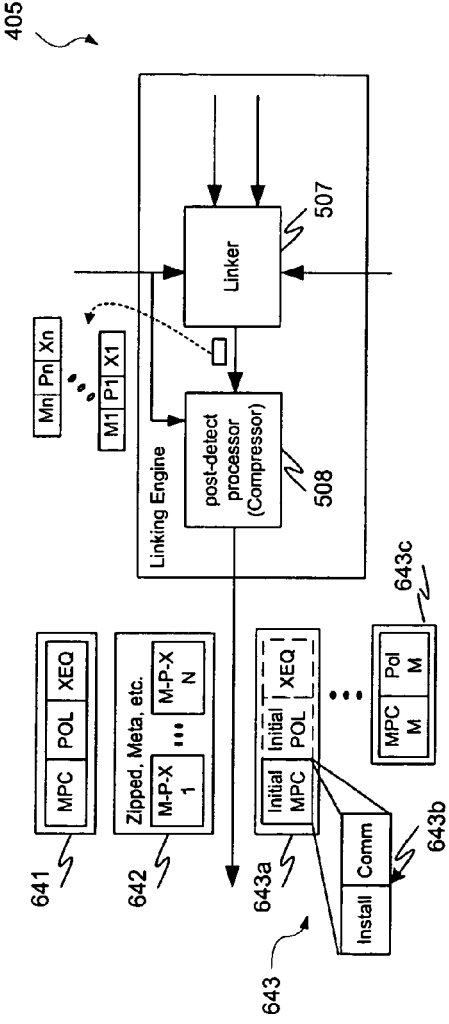

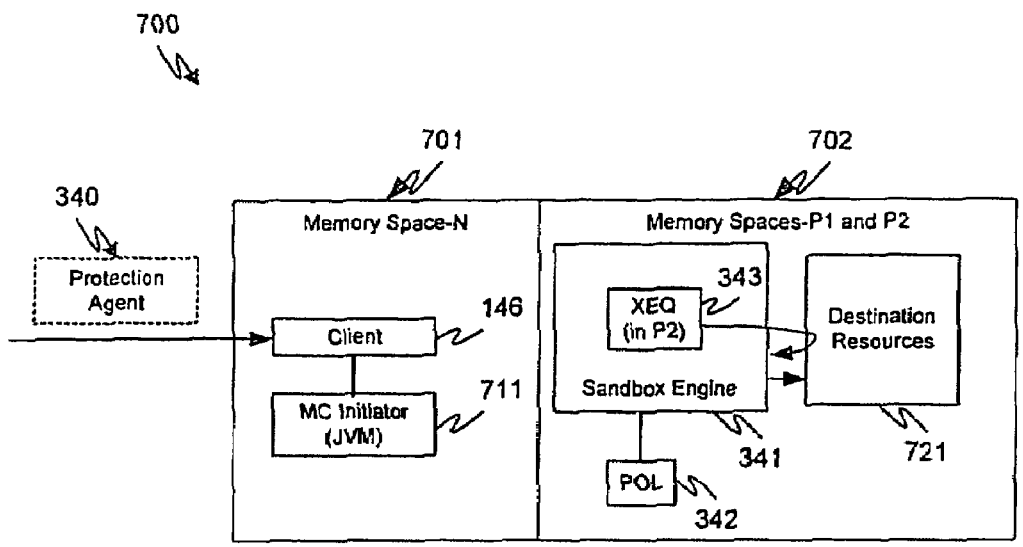
FIG. 7a
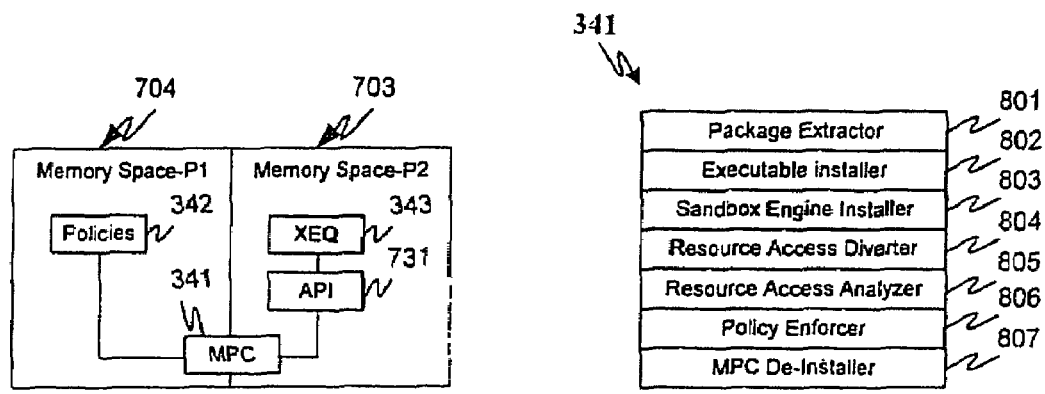
FIG. 7b  FIG. 8

MALICIOUS MOBILE CODE RUNTIME MONITORING SYSTEM AND METHODS

PRIORITY REFERENCE TO RELATED APPLICATIONS

This application is a continuation of and incorporates by reference patent application Ser. No. 09/861,229, filed May 17, 2001 now U.S. Pat. No. 7,058,822, which claims benefit of reference provisional application Ser. No. 60/205,591 entitled "Computer Network Malicious Code Runtime Monitoring," filed on May 17, 2000 by inventors Nimrod Itzhak Vered, et al. This application also incorporates by reference the provisional application Ser. No. 60/205,591. This application is also a Continuation-In-Part of and hereby incorporates by reference patent application Ser. No. 09/539,667, now U.S. Pat. No. 6,804,780, entitled "System and Method for Protecting a Computer and a Network from Hostile Downloadables" filed on Mar. 30, 2000 by inventor Shlomo Touboul. This application is also a Continuation-In-Part of and hereby incorporates by reference patent application Ser. No. 09/551,302, now U.S. Pat. No. 6,480,962, entitled "System and Method for Protecting a Client During Runtime From Hostile Downloadables", filed on Apr. 18, 2000 by inventor Shlomo Touboul.

BACKGROUND OF THE INVENTION

1. Field of the Invention

This invention relates generally to computer networks, and more particularly provides a system and methods for protecting network-connectable devices from undesirable downloadable operation.

2. Description of the Background Art

Advances in networking technology continue to impact an increasing number and diversity of users. The Internet, for example, already provides to expert, intermediate and even novice users the informational, product and service resources of over 100,000 interconnected networks owned by governments, universities, nonprofit groups, companies, etc. Unfortunately, particularly the Internet and other public networks have also become a major source of potentially system-fatal or otherwise damaging computer code commonly referred to as "viruses."

Efforts to forestall viruses from attacking networked computers have thus far met with only limited success at best. Typically, a virus protection program designed to identify and remove or protect against the initiating of known viruses is installed on a network firewall or individually networked computer. The program is then inevitably surmounted by some new virus that often causes damage to one or more computers. The damage is then assessed and, if isolated, the new virus is analyzed. A corresponding new virus protection program (or update thereof) is then developed and installed to combat the new virus, and the new program operates successfully until yet another new virus appears—and so on. Of course, damage has already typically been incurred.

To make matters worse, certain classes of viruses are not well recognized or understood, let alone protected against. It is observed by this inventor, for example, that Downloadable information comprising program code can include distributable components (e.g. Java™ applets and JavaScript scripts, ActiveX™ controls, Visual Basic, add-ins and/or others). It can also include, for example, application programs, Trojan horses, multiple compressed programs such as zip or meta files, among others. U.S. Pat. No. 5,983,348 to Shuang, however, teaches a protection system for protecting against only distributable components including "Java applets or ActiveX controls", and further does so using resource intensive and high bandwidth static Downloadable content and operational analysis, and modification of the Downloadable component; Shuang further fails to detect or protect against additional program code included within a tested Downloadable. U.S. Pat. No. 5,974,549 to Golan teaches a protection system that further focuses only on protecting against ActiveX controls and not other distributable components, let alone other Downloadable types. U.S. Pat. No. 6,167,520 to Touboul enables more accurate protection than Shuang or Golan, but lacks the greater flexibility and efficiency taught herein, as do Shuang and Golan.

Accordingly, there remains a need for efficient, accurate and flexible protection of computers and other network connectable devices from malicious Downloadables.

SUMMARY OF THE INVENTION

The present invention provides protection systems and methods capable of protecting a personal computer ("PC") or other persistently or even intermittently network accessible devices or processes from harmful, undesirable, suspicious or other "malicious" operations that might otherwise be effectuated by remotely operable code. While enabling the capabilities of prior systems, the present invention is not nearly so limited, resource intensive or inflexible, and yet enables more reliable protection. For example, remotely operable code that is protectable against can include downloadable application programs, Trojan horses and program code groupings, as well as software "components", such as Java™ applets, ActiveX™ controls, JavaScript™/Visual Basic scripts, add-ins, etc., among others. Protection can also be provided in a distributed interactively, automatically or mixed configurable manner using protected client, server or other parameters, redirection, local/remote logging, etc., and other server/client based protection measures can also be separately and/or interoperably utilized, among other examples.

In one aspect, embodiments of the invention provide for determining, within one or more network "servers" (e.g. firewalls, resources, gateways, email relays or other devices/ processes that are capable of receiving-and-transferring a Downloadable) whether received information includes executable code (and is a "Downloadable"). Embodiments also provide for delivering static, configurable and/or extensible remotely operable protection policies to a Downloadable-destination, more typically as a sandboxed package including the mobile protection code, downloadable policies and one or more received Downloadables. Further client-based or remote protection code/policies can also be utilized in a distributed manner. Embodiments also provide for causing the mobile protection code to be executed within a Downloadable-destination in a manner that enables various Downloadable operations to be detected, intercepted or further responded to via protection operations. Additional server/ information-destination device security or other protection is also enabled, among still further aspects.

A protection engine according to an embodiment of the invention is operable within one or more network servers, firewalls or other network connectable information re-communicating devices (as are referred to herein summarily one or more "servers" or "re-communicators"). The protection engine includes an information monitor for monitoring information received by the server, and a code detection engine for determining whether the received information includes executable code. The protection engine also includes a packaging engine for causing a sandboxed package, typically including mobile protection code and downloadable protection policies to be sent to a Downloadable-destination in conjunction with the received information, if the received information is determined to be a Downloadable.

A sandboxed package according to an embodiment of the invention is receivable by and operable with a remote Downloadable-destination. The sandboxed package includes mobile protection code ("MPC") for causing one or more predetermined malicious operations or operation combinations of a Downloadable to be monitored or otherwise intercepted. The sandboxed package also includes protection policies (operable alone or in conjunction with further Downloadable-destination stored or received policies/MPCs) for causing one or more predetermined operations to be performed if one or more undesirable operations of the Downloadable is/are intercepted. The sandboxed package can also include a corresponding Downloadable and can provide for initiating the Downloadable in a protective "sandbox". The MPC/policies can further include a communicator for enabling further MPC/policy information or "modules" to be utilized and/or for event logging or other purposes.

A sandbox protection system according to an embodiment of the invention comprises an installer for enabling a received MPC to be executed within a Downloadable-destination (device/process) and further causing a Downloadable application program, distributable component or other received downloadable code to be received and installed within the Downloadable-destination. The protection system also includes a diverter for monitoring one or more operation attempts of the Downloadable, an operation analyzer for determining one or more responses to the attempts, and a security enforcer for effectuating responses to the monitored operations. The protection system can further include one or more security policies according to which one or more protection system elements are operable automatically (e.g. programmatically) or in conjunction with user intervention (e.g. as enabled by the security enforcer). The security policies can also be configurable/extensible in accordance with further downloadable and/or Downloadable-destination information.

A method according to an embodiment of the invention includes receiving downloadable information, determining whether the downloadable information includes executable code, and causing a mobile protection code and security policies to be communicated to a network client in conjunction with security policies and the downloadable information if the downloadable information is determined to include executable code. The determining can further provide multiple tests for detecting, alone or together, whether the downloadable information includes executable code.

A further method according to an embodiment of the invention includes forming a sandboxed package that includes mobile protection code ("MPC"), protection policies, and a received, detected-Downloadable, and causing the sandboxed package to be communicated to and installed by a receiving device or process ("user device") for responding to one or more malicious operation attempts by the detected-Downloadable from within the user device. The MPC/policies can further include a base "module" and a "communicator" for enabling further up/downloading of one or more further "modules" or other information (e.g. events, user/user device information, etc.).

Another method according to an embodiment of the invention includes installing, within a user device, received mobile protection code ("MPC") and protection policies in conjunction with the user device receiving a downloadable application program, component or other Downloadable(s). The method also includes determining, by the MPC, a resource access attempt by the Downloadable, and initiating, by the MPC, one or more predetermined operations corresponding to the attempt. (Predetermined operations can, for example, comprise initiating user, administrator, client, network or protection system determinable operations, including but not limited to modifying the Downloadable operation, extricating the Downloadable, notifying a user/another, maintaining a local/remote log, causing one or more MPCs/policies to be downloaded, etc.)

Advantageously, systems and methods according to embodiments of the invention enable potentially damaging, undesirable or otherwise malicious operations by even unknown mobile code to be detected, prevented, modified and/or otherwise protected against without modifying the mobile code. Such protection is further enabled in a manner that is capable of minimizing server and client resource requirements, does not require pre-installation of security code within a Downloadable-destination, and provides for client specific or generic and readily updateable security measures to be flexibly and efficiently implemented. Embodiments further provide for thwarting efforts to bypass security measures (e.g. by "hiding" undesirable operation causing information within apparently inert or otherwise "friendly" downloadable information) and/or dividing or combining security measures for even greater flexibility and/or efficiency.

Embodiments also provide for determining protection policies that can be downloaded and/or ascertained from other security information (e.g. browser settings, administrative policies, user input, uploaded information, etc.). Different actions in response to different Downloadable operations, clients, users and/or other criteria are also enabled, and embodiments provide for implementing other security measures, such as verifying a downloadable source, certification, authentication, etc. Appropriate action can also be accomplished automatically (e.g. programmatically) and/or in conjunction with alerting one or more users/administrators, utilizing user input, etc. Embodiments further enable desirable Downloadable operations to remain substantially unaffected, among other aspects.

BRIEF DESCRIPTION OF THE DRAWINGS

FIG. 1a is a block diagram illustrating a network system in accordance with an embodiment of the present invention;

FIG. 1b is a block diagram illustrating a network subsystem example in accordance with an embodiment of the invention;

FIG. 1c is a block diagram illustrating a further network subsystem example in accordance with an embodiment of the invention;

FIG. 5 is a block diagram illustrating a content inspection engine according to an embodiment of the invention;

FIG. 6a is a block diagram illustrating protection engine parameters according to an embodiment of the invention;

FIG. 6b is a flow diagram illustrating a linking engine use in conjunction with ordinary, compressed and distributable sandbox package utilization, according to an embodiment of the invention;

FIG. 7a is a flow diagram illustrating a sandbox protection system operating within a destination system, according to an embodiment of the invention;

FIG. 7b is a block diagram illustrating memory allocation usable in conjunction with the protection system of FIG. 7a, according to an embodiment of the invention;

FIG. 8 is a block diagram illustrating a mobile protection code according to an embodiment of the invention;

DETAILED DESCRIPTION

Figure 2:
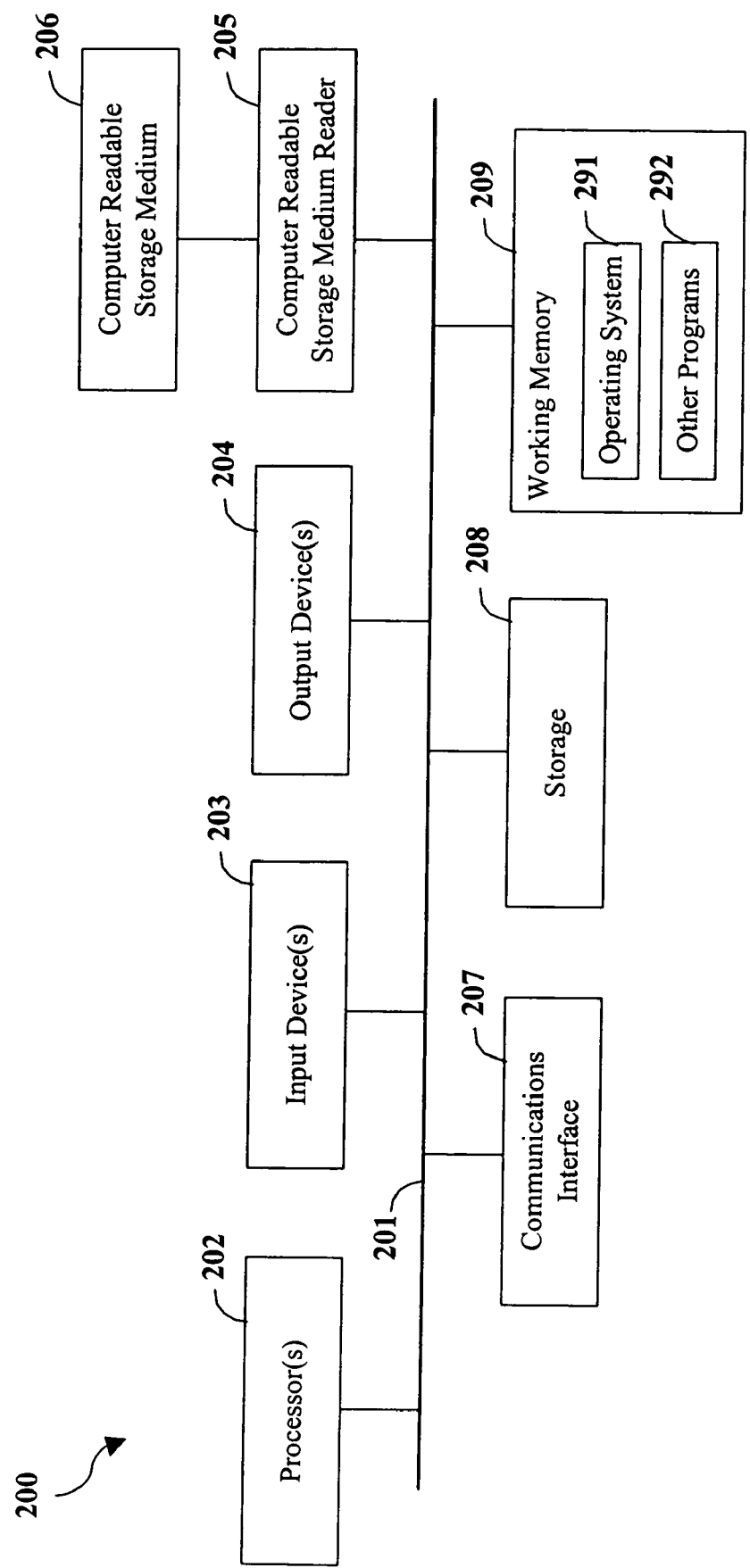
FIG. 2 is a block diagram illustrating a computer system in accordance with an embodiment of the invention.

In providing malicious mobile code runtime monitoring systems and methods, embodiments of the invention enable actually or potentially undesirable operations of even unknown malicious code to be efficiently and flexibly avoided. Embodiments provide, within one or more "servers" (e.g. firewalls, resources, gateways, email relays or other information re-communicating devices), for receiving downloadable-information and detecting whether the downloadable-information includes one or more instances of executable code (e.g. as with a Trojan horse, zip/meta file etc.). Embodiments also provide for separately or interoperably conducting additional security measures within the server, within a Downloadable-destination of a detected-Downloadable, or both.

Embodiments further provide for causing mobile protection code ("MPC") and downloadable protection policies to be communicated to, installed and executed within one or more received information destinations in conjunction with a detected-Downloadable. Embodiments also provide, within an information-destination, for detecting malicious operations of the detected-Downloadable and causing responses thereto in accordance with the protection policies (which can correspond to one or more user, Downloadable, source, destination, or other parameters), or further downloaded or downloadable-destination based policies (which can also be configurable or extensible). (Note that the term "or", as used herein, is generally intended to mean "and/or" unless otherwise indicated.) FIGS. 1a through 1c illustrate a computer network system 100 according to an embodiment of the invention. FIG. 1a broadly illustrates system 100, while FIGS. 1b and 1c illustrate exemplary protectable subsystem implementations corresponding with system 104 or 106 of FIG. 1a.

Beginning with FIG. 1a, computer network system 100 includes an external computer network 101, such as a Wide Area Network or "WAN" (e.g. the Internet), which is coupled to one or more network resource servers (summarily depicted as resource server-1 102 and resource server-N 103). Where external network 101 includes the Internet, resource servers 1-N (102, 103) might provide one or more resources including web pages, streaming media, transaction-facilitating information, program updates or other downloadable information, summarily depicted as resources 121, 131 and 132. Such information can also include more traditionally viewed "Downloadables" or "mobile code" (i.e. distributable components), as well as downloadable application programs or other further Downloadables, such as those that are discussed herein. (It will be appreciated that interconnected networks can also provide various other resources as well.)

Also coupled via external network 101 are subsystems 104-106. Subsystems 104-106 can, for example, include one or more servers, personal computers ("PCs"), smart appliances, personal information managers or other devices/processes that are at least temporarily or otherwise intermittently directly or indirectly connectable in a wired or wireless manner to external network 101 (e.g. using a dialup, DSL, cable modem, cellular connection, ERJRF, or various other suitable current or future connection alternatives). One or more of subsystems 104-106 might further operate as user devices that are connectable to external network 101 via an internet service provider ("ISP") or local area network ("LAN"), such as a corporate intranet, or home, portable device or smart appliance network, among other examples.

FIG. 1a also broadly illustrates how embodiments of the invention are capable of selectively, modifiably or extensibly providing protection to one or more determinable ones of networked subsystems 104-106 or elements thereof (not shown) against potentially harmful or other undesirable ("malicious") effects in conjunction with receiving downloadable information. "Protected" subsystem 104, for example, utilizes a protection in accordance with the teachings herein, while "unprotected" subsystem-N 105 employs no protection, and protected subsystem-M 106 might employ one or more protections including those according to the teachings herein, other protection, or some combination.

System 100 implementations are also capable of providing protection to redundant elements 107 of one or more of subsystems 104-106 that might be utilized, such as backups, failsafe elements, redundant networks, etc. Where included, such redundant elements are also similarly protectable in a separate, combined or coordinated manner using embodiments of the present invention either alone or in conjunction with other protection mechanisms. In such cases, protection can be similarly provided singly, as a composite of component operations or in a backup fashion. Care should, however, be exercised to avoid potential repeated protection engine execution corresponding to a single Downloadable; such "chaining" can cause a Downloadable to operate incorrectly or not at all, unless a subsequent detection engine is configured to recognize a prior packaging of the Downloadable.

FIGS. 1b and 1c further illustrate, by way of example, how protection systems according to embodiments of the invention can be utilized in conjunction with a wide variety of different system implementations. In the illustrated examples, system elements are generally configurable in a manner commonly referred to as a "client-server" configuration, as is typically utilized for accessing Internet and many other network resources. For clarity sake, a simple client-server configuration will be presumed unless otherwise indicated. It will be appreciated, however, that other configurations of interconnected elements might also be utilized (e.g. peer-peer, routers, proxy servers, networks, converters, gateways, services, network reconfiguring elements, etc.) in accordance with a particular application.

The FIG. 1b example shows how a suitable protected system 104a (which can correspond to subsystem-1 104 or subsystem-M 106 of FIG. 1) can include a protection-initiating host "server" or "re-communicator" (e.g. ISP server 140a), one or more user devices or "Downloadable-destinations" 145, and zero or more redundant elements (which elements are summarily depicted as redundant client device/process 145a). In this example, ISP server 140a includes one or more email, Internet or other servers 141a, or other devices or processes capable of transferring or otherwise "re-communicating" downloadable information to user devices 145. Server 141a further includes protection engine or "PE" 142a, which is capable of supplying mobile protection code ("MPC") and protection policies for execution by client devices 145. One or more of user devices 145 can further include a respective one or more clients 146 for utilizing information received via server 140a, in accordance with which MPC and protection policies are operable to protect user devices 145 from detrimental, undesirable or otherwise "malicious" operations of downloadable information also received by user device 145.

The FIG. 1c example shows how a further suitable protected system 104b can include, in addition to a "re-communicator", such as server 142b, a firewall 143c (e.g. as is typically the case with a corporate intranet and many existing or proposed home/smart networks.) In such cases, a server 141b or firewall 143 can operate as a suitable protection engine host. A protection engine can also be implemented in a more distributed manner among two or more protection engine host systems or host system elements, such as both of server 141b and firewall 143, or in a more integrated-manner, for example, as a standalone device. Redundant system or system protection elements can also be similarly provided in a more distributed or integrated manner (see above).

System 104b also includes internal network 144 and user devices 145. User devices 145 further include a respective one or more clients 146 for utilizing information received via server 140a, in accordance with which the MPCs or protection policies are operable. (As in the previous example, one or more of user devices 145 can also include or correspond with similarly protectable redundant system elements, which are not shown.)

It will be appreciated that the configurations of FIGS. 1a-1c are merely exemplary. Alternative embodiments might, for example, utilize other suitable connections, devices or processes. One or more devices can also be configurable to operate as a network server, firewall, smart router, a resource server servicing deliverable third-party/manufacturer postings, a user device operating as a firewall/server, or other information-suppliers or intermediaries (i.e. as a "re-communicator" or "server") for servicing one or more further interconnected devices or processes or interconnected levels of devices or processes. Thus, for example, a suitable protection engine host can include one or more devices or processes capable of providing or supporting the providing of mobile protection code or other protection consistent with the teachings herein. A suitable information-destination or "user device" can further include one or more devices or processes (such as email, browser or other clients) that are capable of receiving and initiating or otherwise hosting a mobile code execution.

FIG. 2 illustrates an exemplary computing system 200, that can comprise one or more of the elements of FIGS. 1a through 1c. While other application-specific alternatives might be utilized, it will be presumed for clarity sake that system 100 elements (FIGS. 1a-c) are implemented in hardware, software or some combination by one or more processing systems consistent therewith, unless otherwise indicated.

Computer system 200 comprises elements coupled via communication channels (e.g. bus 201) including one or more general or special purpose processors 202, such as a Pentium® or Power PC®, digital signal processor ("DSP"), etc. System 200 elements also include one or more input devices 203 (such as a mouse, keyboard, microphone, pen, etc.), and one or more output devices 204, such as a suitable display, speakers, actuators, etc., in accordance with a particular application.

System 200 also includes a computer readable storage media reader 205 coupled to a computer readable storage medium 206, such as a storage/memory device or hard or removable storage/memory media; such devices or media are further indicated separately as storage device 208 and memory 209, which can include hard disk variants, floppy/compact disk variants, digital versatile disk ("DVD") variants, smart cards, read only memory, random access memory, cache memory, etc., in accordance with a particular application. One or more suitable communication devices 207 can also be included, such as a modem, DSL, infrared or other suitable transceiver, etc. for providing inter-device communication directly or via one or more suitable private or public networks that can include but are not limited to those already discussed.

Working memory further includes operating system ("OS") elements and other programs, such as application programs, mobile code, data, etc. for implementing system 100 elements that might be stored or loaded therein during use. The particular OS can vary in accordance with a particular device, features or other aspects in accordance with a particular application (e.g. Windows, Mac, Linux, Unix or Palm OS variants, a proprietary OS, etc.). Various programming languages or other tools can also be utilized, such as C++, Java, Visual Basic, etc. As will be discussed, embodiments can also include a network client such as a browser or email client, e.g. as produced by Netscape, Microsoft or others, a mobile code executor such as an OS task manager, Java Virtual Machine ("JVM"), etc., and an application program interface ("API"), such as a Microsoft Windows or other suitable element in accordance with the teachings herein. (It will also become apparent that embodiments might also be implemented in conjunction with a resident application or combination of mobile code and resident application components.)

One or more system 200 elements can also be implemented in hardware, software or a suitable combination. When implemented in software (e.g. as an application program, object, downloadable, servlet, etc. in whole or part), a system 200 element can be communicated transitionally or more persistently from local or remote storage to memory (or cache memory, etc.) for execution, or another suitable mechanism can be utilized, and elements can be implemented in compiled or interpretive form. Input, intermediate or resulting data or functional elements can further reside more transitionally or more persistently in a storage media, cache or more persistent volatile or non-volatile memory, (e.g. storage device 207 or memory 208) in accordance with a particular application.

Figure 3:
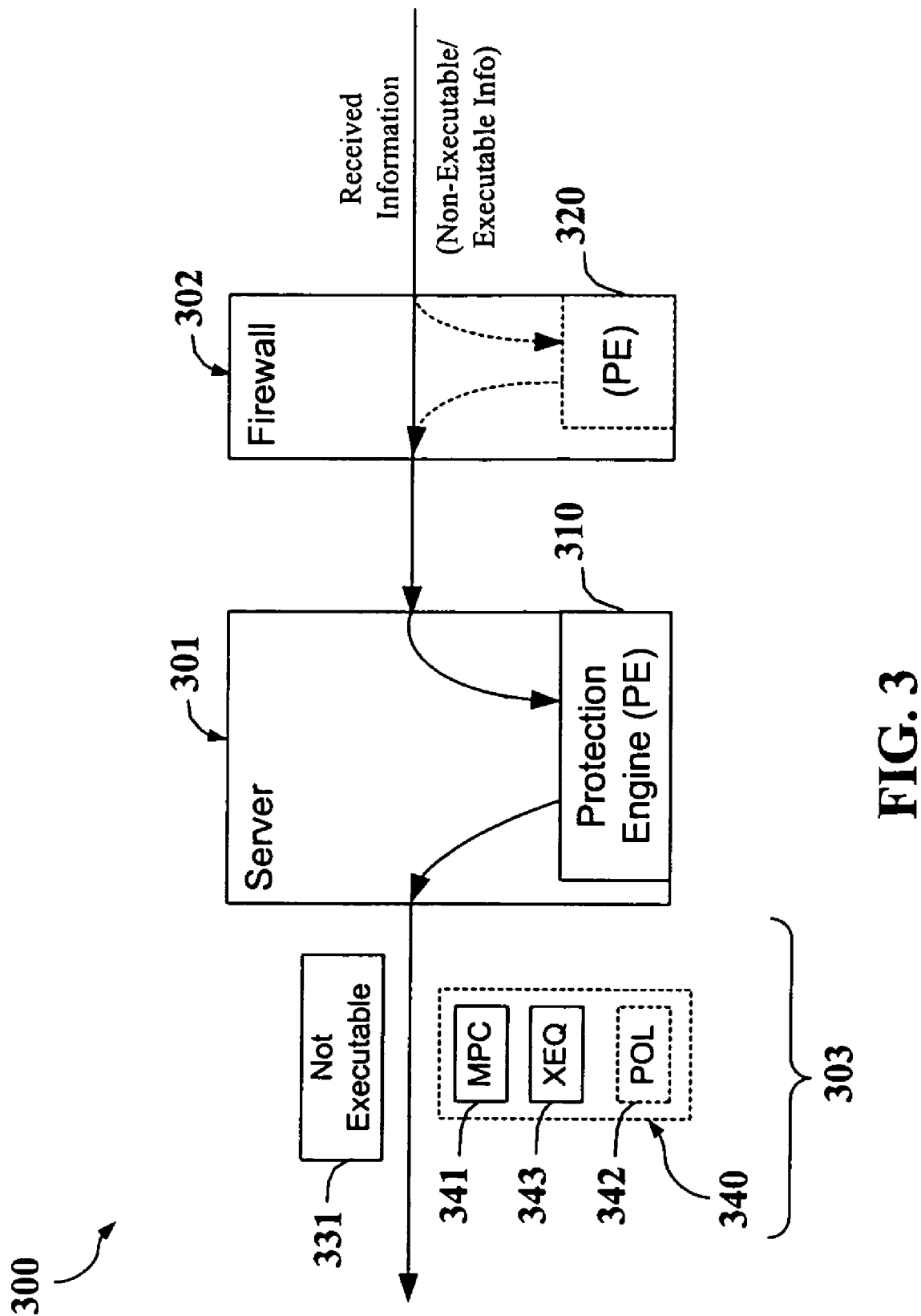
FIG. 3 is a flow diagram broadly illustrating a protection system host according to an embodiment of the invention.

FIG. 3 illustrates an interconnected re-communicator 300 generally consistent with system 140b of FIG. 1, according to an embodiment of the invention. As with system 140b, system 300 includes a server 301, and can also include a firewall 302. In this implementation, however, either server 301 or firewall 302 (if a firewall is used) can further include a protection engine (310 or 320 respectively). Thus, for example, an included firewall can process received information in a conventional manner, the results of which can be further processed by protection engine 310 of server 301, or information processed by protection engine 320 of an included firewall 302 can be processed in a conventional manner by server 301. (For clarity sake, a server including a singular protection engine will be presumed, with or without a firewall, for the remainder of the discussion unless otherwise indicated. Note, however, that other embodiments consistent with the teachings herein might also be utilized.)

FIG. 3 also shows how information received by server 301 (or firewall 302) can include non-executable information, executable information or a combination of non-executable and one or more executable code portions (e.g. so-called Trojan horses that include a hostile Downloadable within a friendly one, combined, compressed or otherwise encoded files, etc.). Particularly such combinations will likely remain undetected by a firewall or other more conventional protection systems. Thus, for convenience, received information will also be referred to as a "potential-Downloadable", and received information found to include executable code will be referred to as a "Downloadable" or equivalently as a "detected-Downloadable" (regardless of whether the executable code includes one or more application programs, distributable "components" such as Java, ActiveX, add-in, etc.).

Protection engine 310 provides for detecting whether received potential-Downloadables include executable code, and upon such detection, for causing mobile protection code ("MPC") to be transferred to a device that is a destination of the potential-Downloadable (or "Downloadable-destination"). Protection engine 310 can also provide protection policies in conjunction with the MPC (or thereafter as well), which MPC/policies can be automatically (e.g. programmatically) or interactively configurable in accordance user, administrator, downloadable source, destination, operation, type or various other parameters alone or in combination (see below). Protection engine 310 can also provide or operate separately or interoperably in conjunction with one or more of certification, authentication, downloadable tagging, source checking, verification, logging, diverting or other protection services via the MPC, policies, other local/remote server or destination processing, etc. (e.g. which can also include protection mechanisms taught by the above-noted prior applications; see FIG. 4).

Operationally, protection engine 310 of server 301 monitors information received by server 301 and determines whether the received information is deliverable to a protected destination, e.g. using a suitable monitor/data transfer mechanism and comparing a destination-address of the received information to a protected destination set, such as a protected destinations list, array, database, etc. (All deliverable information or one or more subsets thereof might also be monitored.) Protection engine 310 further analyzes the potential-Downloadable and determines whether the potential-Downloadable includes executable code. If not, protection engine 310 enables the not executable potential-Downloadable 331 to be delivered to its destination in an unaffected manner.

In conjunction with determining that the potential-Downloadable is a detected-Downloadable, protection engine 310 also causes mobile protection code or "MPC" 341 to be communicated to the Downloadable-destination of the Downloadable, more suitably in conjunction with the detected-Downloadable 343 (see below). Protection engine 310 further causes downloadable protection policies 342 to be delivered to the Downloadable-destination, again more suitably in conjunction with the detected-Downloadable. Protection policies 342 provide parameters (or can additionally or alternatively provide additional mobile code) according to which the MPC is capable of determining or providing applicable protection to a Downloadable-destination against malicious Downloadable operations.

(One or more "checked", tag, source, destination, type, detection or other security result indicators, which are not shown, can also be provided as corresponding to determined non-Downloadables or Downloadables, e.g. for testing, logging, further processing, further identification tagging or other purposes in accordance with a particular application.)

Further MPCs, protection policies or other information are also deliverable to a the same or another destination, for example, in accordance with communication by an MPC/protection policies already delivered to a downloadable-destination. Initial or subsequent MPCs/policies can further be selected or configured in accordance with a Downloadable-destination indicated by the detected-Downloadable, destination-user or administrative information, or other information providable to protection engine 310 by a user, administrator, user system, user system examination by a communicated MPC, etc. (Thus, for example, an initial MPC/policies can also be initially provided that are operable with or optimized for more efficient operation with different Downloadable-destinations or destination capabilities.)

While integrated protection constraints within the MPC might also be utilized, providing separate protection policies has been found to be more efficient, for example, by enabling more specific protection constraints to be more easily updated in conjunction with detected-Downloadable specifics, post-download improvements, testing, etc. Separate policies can further be more efficiently provided (e.g. selected, modified, instantiated, etc.) with or separately from an MPC, or in accordance with the requirements of a particular user, device, system, administration, later improvement, etc., as might also be provided to protection engine 310 (e.g. via user/MPC uploading, querying, parsing a Downloadable, or other suitable mechanism implemented by one or more servers or Downloadable-destinations).

(It will also become apparent that performing executable code detection and communicating to a downloadable-Destination an MPC and any applicable policies as separate from a detected-Downloadable is more accurate and far less resource intensive than, for example, performing content and operation scanning, modifying a Downloadable, or providing completely Downloadable-destination based security.)

System 300 enables a single or extensible base-MPC to be provided, in anticipation or upon receipt of a first Downloadable, that is utilized thereafter to provide protection of one or more Downloadable-destinations. It is found, however, that providing an MPC upon each detection of a Downloadable (which is also enabled) can provide a desirable combination of configurability of the MPC/policies and lessened need for management (e.g. given potentially changing user/destination needs, enabling testing, etc.).

Providing an MPC upon each detection of a Downloadable also facilitates a lessened demand on destination resources, e.g. since information-destination resources used in executing the MPC/policies can be re-allocated following such use. Such alternatives can also be selectively, modifiably or extensibly provided (or further in accordance with other application-specific factors that might also apply.) Thus, for example, a base-MPC or base-policies might be provided to a user device that is/are extensible via additionally downloadable "modules" upon server 301 detection of a Downloadable deliverable to the same user device, among other alternatives.

In accordance with a further aspect of the invention, it is found that improved efficiency can also be achieved by causing the MPC to be executed within a Downloadable-destination in conjunction with, and further, prior to initiation of the detected Downloadable. One mechanism that provides for greater compatibility and efficiency in conjunction with conventional client-based Downloadable execution is for a protection engine to form a sandboxed package 340 including MPC 341, the detected-Downloadable 343 and any policies 342. For example, where the Downloadable is a binary executable to be executed by an operating system, protection engine 310 forms a protected package by concatenating, within sandboxed package 340, MPC 341 for delivery to a Downloadable-destination first, followed by protection policies 342 and Downloadable 343. (Concatenation or techniques consistent therewith can also be utilized for providing a protecting package corresponding to a Java applet for execution by a JVM of a Downloadable-destination, or with regard to ActiveX controls, add-ins or other distributable components, etc.)

The above concatenation or other suitable processing will result in the following. Upon receipt of sandboxed package 340 by a compatible browser, email or other destination-client and activating of the package by a user or the destination-client, the operating system (or a suitable responsively initiated distributed component host) will attempt to initiate sandboxed package 340 as a single Downloadable. Such processing will, however, result in initiating the MPC 341 and—in accordance with further aspects of the invention—the MPC will initiate the Downloadable in a protected manner, further in accordance with any applicable included or further downloaded protection policies 342. (While system 300 is also capable of ascertaining protection policies stored at a Downloadable-destination, e.g. by poll, query, etc. of available destination information, including at least initial policies within a suitable protecting package is found to avoid associated security concerns or inefficiencies.)

Figure 4:
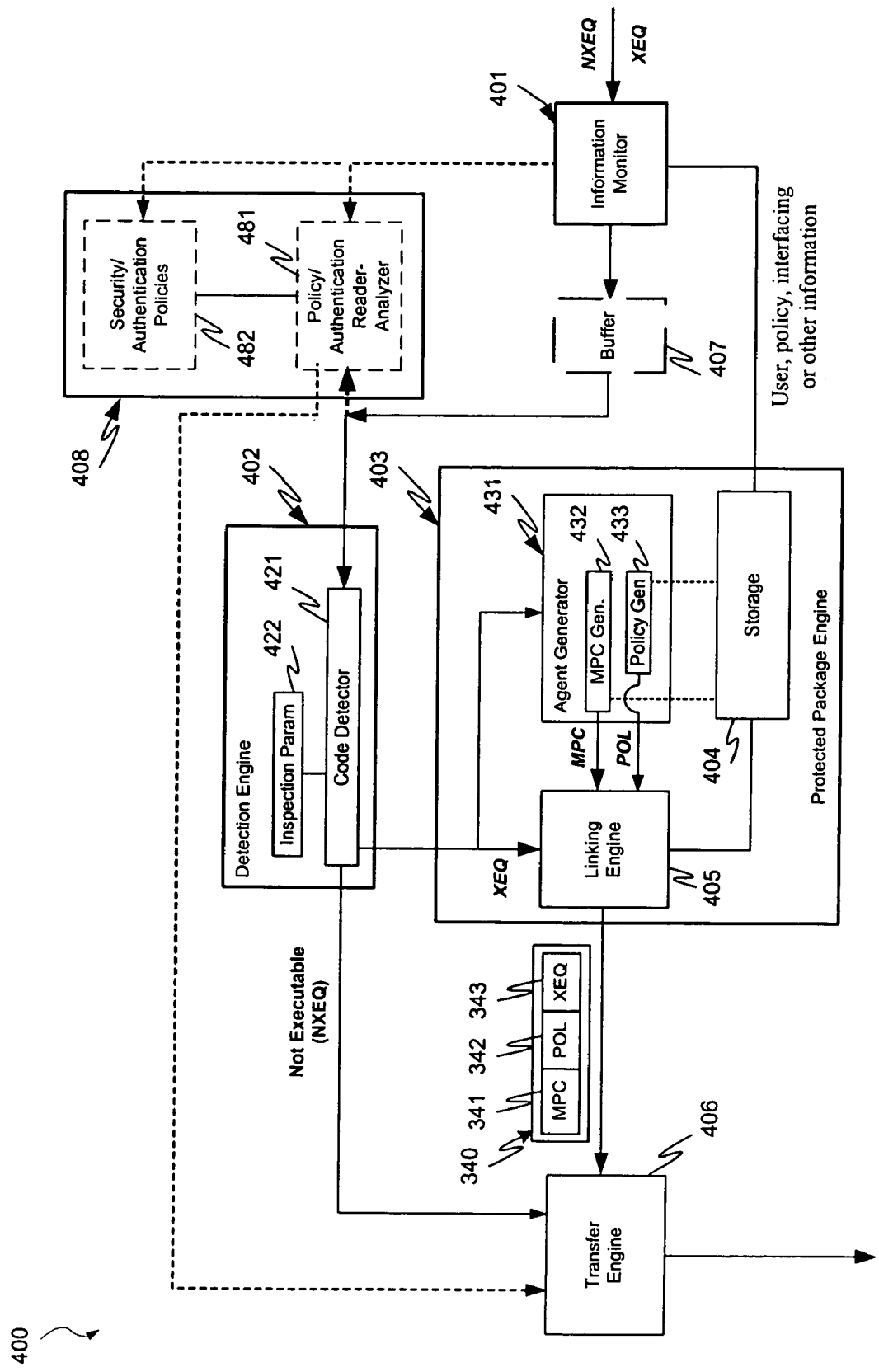
FIG. 4 is a block diagram illustrating a protection engine according to an embodiment of the invention.

Turning to FIG. 4, a protection engine 400 generally consistent with protection engine 310 (or 320) of FIG. 3 is illustrated in accordance with an embodiment of the invention. Protection engine 400 comprises information monitor 401, detection engine 402, and protected packaging engine 403, which further includes agent generator 431, storage 404, linking engine 405, and transfer engine 406. Protection engine 400 can also include a buffer 407, for temporarily storing a received potential-Downloadable, or one or more systems for conducting additional authentication, certification, verification or other security processing (e.g. summarily depicted as security system 408) Protection engine 400 can further provide for selectively re-directing, further directing, logging, etc. of a potential/detected Downloadable or information corresponding thereto in conjunction with detection, other security, etc., in accordance with a particular application.

(Note that FIG. 4, as with other figures included herein, also depicts exemplary signal flow arrows; such arrows are provided to facilitate discussion, and should not be construed as exclusive or otherwise limiting.)

Information monitor 401 monitors potential-Downloadables received by a host server and provides the information via buffer 407 to detection engine 402 or to other system 400 elements. Information monitor 401 can be configured to monitor host server download operations in conjunction with a user or a user-device that has logged-on to the server, or to receive information via a server operation hook, servlet, communication channel or other suitable mechanism.

Information monitor 401 can also provide for transferring, to storage 404 or other protection engine elements, configuration information including, for example, user, MPC, protection policy, interfacing or other configuration information (e.g. see FIG. 6). Such configuration information monitoring can be conducted in accordance with a user/device logging onto or otherwise accessing a host server, via one or more of configuration operations, using an applet to acquire such information from or for a particular user, device or devices, via MPC/policy polling of a user device, or via other suitable mechanisms.

Detection engine 402 includes code detector 421, which receives a potential-Downloadable and determines, more suitably in conjunction with inspection parameters 422, whether the potential-Downloadable includes executable code and is thus a "detected-Downloadable". (Code detector 421 can also include detection processors for performing file decompression or other "decoding", or such detection-facilitating processing as decryption, utilization/support of security system 408, etc. in accordance with a particular application.)

Detection engine 402 further transfers a detected-downloadable ("XEQ") to protected packaging engine 403 along with indicators of such detection, or a determined non-executable ("NXEQ") to transfer engine 406. (Inspection parameters 422 enable analysis criteria to be readily updated or varied, for example, in accordance with particular source, destination or other potential Downloadable impacting parameters, and are discussed in greater detail with reference to FIG. 5). Detection engine 402 can also provide indicators for delivery of initial and further MPCs/policies, for example, prior to or in conjunction with detecting a Downloadable and further upon receipt of an indicator from an already downloaded MPC/policy. A downloaded MPC/policy can further remain resident at a user device with further modules downloaded upon or even after delivery of a sandboxed package. Such distribution can also be provided in a configurable manner, such that delivery of a complete package or partial packages are automatically or interactively determinable in accordance with user/administrative preferences/policies, among other examples.

Packaging engine 403 provides for generating mobile protection code and protection policies, and for causing delivery thereof (typically with a detected-Downloadable) to a Downloadable-destination for protecting the Downloadable-destination against malicious operation attempts by the detected Downloadable. In this example, packaging engine 403 includes agent generator 43 1, storage 404 and linking engine 405.

Agent generator 431 includes an MPC generator 432 and a protection policy generator 433 for "generating" an MPC and a protection policy (or set of policies) respectively upon receiving one or more "generate MPC/policy" indicators from detection engine 402, indicating that a potential-Downloadable is a detected-Downloadable. MPC generator 432 and protection policy generator 433 provide for generating MPCs and protection policies respectively in accordance with parameters retrieved from storage 404. Agent generator 431 is further capable of providing multiple MPCs/policies, for example, the same or different MPCs/policies in accordance with protecting ones of multiple executables within a zip file, or for providing initial MPCs/policies and then further MPCs/policies or MPC/policy "modules" as initiated by further indicators such as given above, via an indicator of an already downloaded MPC/policy or via other suitable mechanisms. (It will be appreciated that pre-constructed MPCs/policies or other processing can also be utilized, e.g. via retrieval from storage 404, but with a potential decrease in flexibility.)

MPC generator 432 and protection policy generator 433 are further configurable. Thus, for example, more generic MPCs/policies can be provided to all or a grouping of serviced destination-devices (e.g. in accordance with a similarly configured/administered intranet), or different MPCs/policies that can be configured in accordance with one or more of user, network administration, Downloadable-destination or other parameters (e.g. see FIG. 6). As will become apparent, a resulting MPC provides an operational interface to a destination device/process. Thus, a high degree of flexibility and efficiency is enabled in providing such an operational interface within different or differently configurable user devices/processes or other constraints.

Such configurability further enables particular policies to be utilized in accordance with a particular application (e.g. particular system uses, access limitations, user interaction, treating application programs or Java components from a particular known source one way and unknown source ActiveX components, or other considerations). Agent generator 431 further transfers a resulting MPC and protection policy pair to linking engine 405.

Linking engine 405 provides for forming from received component elements (see above) a sandboxed package that can include one or more initial or complete MPCs and applicable protection policies, and a Downloadable, such that the sandboxed package will protect a receiving Downloadable-destination from malicious operation by the Downloadable. Linking engine 405 is implementable in a static or configurable manner in accordance, for example, with characteristics of a particular user device/process stored intermittently or more persistently in storage 404. Linking engine 405 can also provide for restoring a Downloadable, such as a compressed, encrypted or otherwise encoded file that has been decompressed, decrypted or otherwise decoded via detection processing (e.g. see FIG. 6b).

It is discovered, for example, that the manner in which the Windows OS initiates a binary executable or an ActiveX control can be utilized to enable protected initiation of a detected-Downloadable. Linking engine 405 is, for example, configurable to form, for an ordinary single-executable Downloadable (e.g. an application program, applet, etc.) a sandboxed package 340 as a concatenation of ordered elements including an MPC 341, applicable policies 342 and the Downloadable or "XEQ" 343 (e.g. see FIG. 4).

Linking engine 405 is also configurable to form, for a Downloadable received by a server as a compressed single or multiple-executable Downloadable such as a zipped or meta file, a protecting package 340 including one or more MPCs, applicable policies and the one or more included executables of the Downloadable. For example, a sandboxed package can be formed in which a single MPC and policies precede and thus will affect all such executables as a result of inflating and installation. An MPC and applicable policies can also, for example, precede each executable, such that each executable will be separately sandboxed in the same or a different manner according to MPC/policy configuration (see above) upon inflation and installation. (See also FIGS. 5 and 6)

Linking engine is also configurable to form an initial MPC, MPC-policy or sandboxed package (e.g. prior to upon receipt of a downloadable) or an additional MPC, MPC-policy or sandboxed package (e.g. upon or following receipt of a downloadable), such that suitable MPCs/policies can be provided to a Downloadable-destination or other destination in a more distributed manner. In this way, requisite bandwidth or destination resources can be minimized (via two or more smaller packages) in compromise with latency or other considerations raised by the additional required communication.

A configurable linking engine can also be utilized in accordance with other requirements of particular devices/processes, further or different elements or other permutations in accordance with the teachings herein. (It might, for example be desirable to modify the ordering of elements, to provide one or more elements separately, to provide additional information, such as a header, etc., or perform other processing in accordance with a particular device, protocol or other application considerations.)

Policy/authentication reader-analyzer 481 summarily depicts other protection mechanisms that might be utilized in conjunction with Downloadable detection, such as already discussed, and that can further be configurable to operate in accordance with policies or parameters (summarily depicted by security/authentication policies 482). Integration of such further protection in the depicted configuration, for example, enables a potential-Downloadable from a known unfriendly source, a source failing authentication or a provided-source that is confirmed to be fictitious to be summarily discarded, otherwise blocked, flagged, etc. (with or without further processing). Conversely, a potential-Downloadable from a known friendly source (or one confirmed as such) can be transferred with or without further processing in accordance with particular application considerations. (Other configurations including pre or post Downloadable detection mechanisms might also be utilized.)

Finally, transfer engine 406 of protection agent engine 303 provides for receiving and causing linking engine 405 (or other protection) results to be transferred to a destination user device/process. As depicted, transfer engine 406 is configured to receive and transfer a Downloadable, a determined non-executable or a sandboxed package. However, transfer engine 406 can also be provided in a more configurable manner, such as was already discussed for other system 400 elements. (Any one or more of system 400 elements might be configurably implemented in accordance with a particular application.) Transfer engine 406 can perform such transfer, for example, by adding the information to a server transfer queue (not shown) or utilizing another suitable method.

Turning to FIG. 5 with reference to FIG. 4, a code detector 421 example is illustrated in accordance with an embodiment of the invention. As shown, code detector 421 includes data fetcher 501, parser 502, file-type detector 503, inflator 504 and control 506; other depicted elements. While implementable and potentially useful in certain instances, are found to require substantial overhead, to be less accurate in certain instances (see above) and are not utilized in a present implementation; these will be discussed separately below. Code detector elements are further configurable in accordance with stored parameters retrievable by data fetcher 501. (A coupling between data fetcher 501 and control 506 has been removed for clarity sake.)

Data fetcher 501 provides for retrieving a potential-Downloadable or portions thereof stored in buffer 407 or parameters from storage 404, and communicates such information or parameters to parser 502. Parser 502 receives a potential-Downloadable or portions thereof from data fetcher 501 and isolates potential-Downloadable elements, such as file headers, source, destination, certificates, etc. for use by further processing elements.

File type detector 502 receives and determines whether the potential-Downloadable (likely) is or includes an executable file type. File-reader 502 can, for example, be configured to analyze a received potential-Downloadable for a file header, which is typically included in accordance with conventional data transfer protocols, such as a portable executable or standard ".exe" file format for Windows OS application programs, a Java class header for Java applets, and so on for other applications, distributed components, etc. "Zipped", meta or other compressed files, which might include one or more executables, also typically provide standard single or multi-level headers that can be read and used to identify included executable code (or other included information types). File type detector 502 is also configurable for analyzing potential-Downloadables for all potential file type delimiters or a more limited subset of potential file type delimiters (e.g. ".exe" or ".com" in conjunction with a DOS or Microsoft Windows OS Downloadable-destination).

Known file type delimiters can, for example, be stored in a more temporary or more persistent storage (e.g. storage 404 of FIG. 4) which file type detector 502 can compare to a received potential-Downloadable. (Such delimiters can thus also be updated in storage 404 as a new file type delimiter is provided, or a more limited subset of delimiters can also be utilized in accordance with a particular Downloadable-destination or other considerations of a particular application.) File type detector 502 further transfers to controller 506 a detected file type indicator indicating that the potential-Downloadable includes or does not include (i.e. or likely include) an executable file type.

In this example, the aforementioned detection processor is also included as pre-detection processor or, more particularly, a configurable file inflator 504. File inflator 504 provides for opening or "inflating" compressed files in accordance with a compressed file type received from file type detector 503 and corresponding file opening parameters received from data fetcher 501. Where a compressed file (e.g. a meta file) includes nested file type information not otherwise reliably provided in an overall file header or other information, inflator 504 returns such information to parser 502. File inflator 504 also provides any now-accessible included executables to control 506 where one or more included files are to be separately packaged with an MPC or policies.

Control 506, in this example, operates in accordance with stored parameters and provides for routing detected non-Downloadables or Downloadables and control information, and for conducting the aforementioned distributed downloading of packages to Downloadable-destinations. In the case of a non-Downloadable, for example, control 506 sends the non-Downloadable to transfer engine 406 (FIG. 4) along with any indicators that might apply. For an ordinary single-executable Downloadable, control 506 sends control information to agent generator 431 and the Downloadable to linking engine 405 along with any other applicable indicators (see 641 of FIG. 6b). Control 506 similarly handles a compressed single-executable Downloadable or a multiple downloadable to be protected using a single sandboxed package. For a multiple-executable Downloadable, control 506 sends control information for each corresponding executable to agent generator agent generator 431, and sends the executable to linking engine 405 along with controls and any applicable indicators, as in 643b of FIG. 6b. (The above assumes, however, that distributed downloading is not utilized; when used —according to applicable parameters—control 506 also operates in accordance with the following.)

Control 506 conducts distributed protection (e.g. distributed packaging) by providing control signals to agent generator 43 1, linking engine 405 and transfer engine 406. In the present example, control 506 initially sends controls to agent generator 431 and linking engine 405 (FIG. 4) causing agent generator to generate an initial MPC and initial policies, and sends control and a detected-Downloadable to linking engine 405. Linking engine 405 forms an initial sandboxed package, which transfer engine causes (in conjunction with further controls) to be downloaded to the Downloadable destination (643a of FIG. 6b). An initial MPC within the sandboxed package includes an installer and a communicator and performs installation as indicated below. The initial MPC also communicates via the communicator controls to control 506 (FIG. 5) in response to which control 506 similarly causes generation of MPC-M and policy-M modules 643c, which linking engine 405 links and transfer engine 406 causes to be sent to the Downloadable destination, and so on for any further such modules.

(It will be appreciated, however, that an initial package might be otherwise configured or sent prior to receipt of a Downloadable in accordance with configuration parameters or user interaction. Information can also be sent to other user devices, such as that of an administrator. Further MPCs/policies might also be coordinated by control 506 or other elements, or other suitable mechanisms might be utilized in accordance with the teachings herein.)

Regarding the remaining detection engine elements illustrated in FIG. 5, where content analysis is utilized, parser 502 can also provide a Downloadable or portions thereof to content detector 505. Content detector 505 can then provide one or more content analyses. Binary detector 551, for example, performs detection of binary information; pattern detector 552 further analyzes the Downloadable for patterns indicating executable code, or other detectors can also be utilized. Analysis results therefrom can be used in an absolute manner, where a first testing result indicating executable code confirms Downloadable detection, which result is then sent to control 506. Alternatively, however, composite results from such analyses can also be sent to control 506 for evaluation. Control 506 can further conduct such evaluation in a summary manner (determining whether a Downloadable is detected according to a majority or minimum number of indicators), or based on a weighting of different analysis results. Operation then continues as indicated above. (Such analysis can also be conducted in accordance with aspects of a destination user device or other parameters.)

FIG. 6a illustrates more specific examples of indicators/parameters and known (or "knowledge base") elements that can be utilized to facilitate the above-discussed system 400 configurability and detection. For clarity sake, indicators, parameters and knowledge base elements are combined as indicated "parameters." It will be appreciated, however, that the particular parameters utilized can differ in accordance with a particular application, and indicators, parameters or known elements, where utilized, can vary and need not correspond exactly with one another. Any suitable explicit or referencing list, database or other storage structure(s) or storage structure configuration(s) can also be utilized to implement a suitable user/device based protection scheme, such as in the above examples, or other desired protection schema.

Executable parameters 601 comprise, in accordance with the above examples, executable file type parameters 611, executable code parameters 612 and code pattern parameters 613 (including known executable file type indicators, header/code indicators and patterns respectively, where code patterns are utilized). Use parameters 602 further comprise user parameters 621, system parameters 622 and general parameters 623 corresponding to one or more users, user classifications, user-system correspondences or destination system, device or processes, etc. (e.g. for generating corresponding MPCs/policies, providing other protection, etc.). The remaining parameters include interface parameters 631 for providing MPC/policy (or further) configurability in accordance with a particular device or for enabling communication with a device user (see below), and other parameters 632.

FIG. 6b illustrates a linking engine 405 according to an embodiment of the invention. As already discussed, linking engine 405 includes a linker for combining MPCs, policies or agents via concatination or other suitable processing in accordance with an OS, JVM or other host executor or other applicable factors that might apply. Linking engine 405 also includes the aforementioned post-detection processor which, in this example, comprises a compressor 508. As noted, compressor 508 receives linked elements from linker 507 and, where a potential-Downloadable corresponds to a compressed file that was inflated during detection, re-forms the compressed file. (Known file information can be provided via configuration parameters, substantially reversal of inflating or another suitable method.) Encryption or other post-detection processing can also be conducted by linking engine 508.

FIGS. 7a, 7b and 8 illustrate a "sandbox protection" system, as operable within a receiving destination-device, according to an embodiment of the invention.

Beginning with FIG. 7a, a client 146 receiving sandbox package 340 will "recognize" sandbox package 340 as a (mobile) executable and cause a mobile code installer 711 (e.g. an OS loader, JVM, etc.) to be initiated. Mobile code installer 711 will also recognize sandbox package 340 as an executable and will attempt to initiate sandbox package 340 at its "beginning." Protection engine 400 processing corresponding to destination 700 use of a such a loader, however, will have resulted in the "beginning" of sandbox package 340 as corresponding to the beginning of MPC 341, as noted with regard to the above FIG. 4 example.

Such protection engine processing will therefore cause a mobile code installer (e.g. OS loader 711, for clarity sake) to initiate MPC 341. In other cases, other processing might also be utilized for causing such initiation or further protection system operation. Protection engine processing also enables MPC 341 to effectively form a protection "sandbox" around Downloadable (e.g. detected-Downloadable or "XEQ") 343, to monitor Downloadable 343, intercept determinable Downloadable 343 operation (such as attempted accesses of Downloadable 343 to destination resources) and, if "malicious", to cause one or more other operations to occur (e.g. providing an alert, offloading the Downloadable, offloading the MPC, providing only limited resource access, possibly in a particular address space or with regard to a particularly "safe" resource or resource operation, etc.).

MPC 341, in the present OS example, executes MPC element installation and installs any policies, causing MPC 341 and protection policies 342 to be loaded into a first memory space, P1. MPC 341 then initiates loading of Downloadable 343. Such Downloadable initiation causes OS loader 711 to load Downloadable 343 into a further working memory space-P2 703 along with an API import table ("IAT") 731 for providing Downloadable 631 with destination resource access capabilities. It is discovered, however that the IAT can be modified so that any call to an API can be redirected to a function within the MPC. The technique for modifying the IAT is documented within the MSDN (Microsoft Developers Network) Library CD in several articles. The technique is also different for each operating system (e.g. between Windows 9x and Windows NT), which can be accommodated by agent generator configurability, such as that given above. MPC 341 therefore has at least initial access to API IAT 731 of Downloadable 632, and provides for diverting, evaluating and responding to attempts by Downloadable 632 to utilize system APIs 731, or further in accordance with protection policies 342. In addition to API diverting, MPC 341 can also install filter drivers, which can be used for controlling access to resources such as a Downloadable-destination file system or registry. Filter driver installation can be conducted as documented in the MSDN or using other suitable methods.

Turning to FIG. 8 with reference to FIG. 7b, an MPC 341 according to an embodiment of the invention includes a package extractor 801, executable installer 802, sandbox engine installer 803, resource access diverter 804, resource access (attempt) analyzer 805, policy enforcer 806 and MPC deinstaller 807. Package extractor 801 is initiated upon initiation of MPC 341, and extracts MPC 341 elements and protection policies 342. Executable installer 802 further initiates installation of a Downloadable by extracting the downloadable from the protected package, and loading the process into memory in suspended mode (so it only loads into memory, but does not start to run). Such installation further causes the operating system to initialize the Downloadable's IAT 731 in the memory space of the downloadable process, P2, as already noted.

Sandbox engine installer 803 (running in process space P1) then installs the sandbox engine (803-805) and policies 342 into the downloadable process space P2. This is done in different way in each operating system (e.g. see above). Resource access diverter 804 further modifies those Downloadable-API IAT entries that correspond with protection policies 342, thereby causing corresponding Downloadable accesses via Downloadable-API IAT 731 to be diverted resource access analyzer 805.

During Downloadable operation, resource access analyzer or "RAA" 805 receives and determines a response to diverted Downloadable (i.e. "malicious") operations in accordance with corresponding protection policies of policies 342. (RAA 805 or further elements, which are not shown, can further similarly provide for other security mechanisms that might also be implemented.) Malicious operations can for example include, in a Windows environment: file operations (e.g. reading, writing, deleting or renaming a file), network operations (e.g. listen on or connect to a socket, send/receive data or view intranet), OS registry or similar operations (read/write a registry item), OS operations (exit OS/client, kill or change the priority of a process/thread, dynamically load a class library), resource usage thresholds (e.g. memory, CPU, graphics), etc.

Policy enforcer 806 receives RAA 805 results and causes a corresponding response to be implemented, again according to the corresponding policies. Policy enforcer 806 can, for example, interact with a user (e.g. provide an alert, receive instructions, etc.), create a log file, respond, cause a response to be transferred to the Downloadable using "dummy" or limited data, communicate with a server or other networked device (e.g. corresponding to a local or remote administrator), respond more specifically with a better known Downloadable, verify accessibility or user/system information (e.g. via local or remote information), even enable the attempted Downloadable access, among a wide variety of responses that will become apparent in view of the teachings herein.

Figure 9:
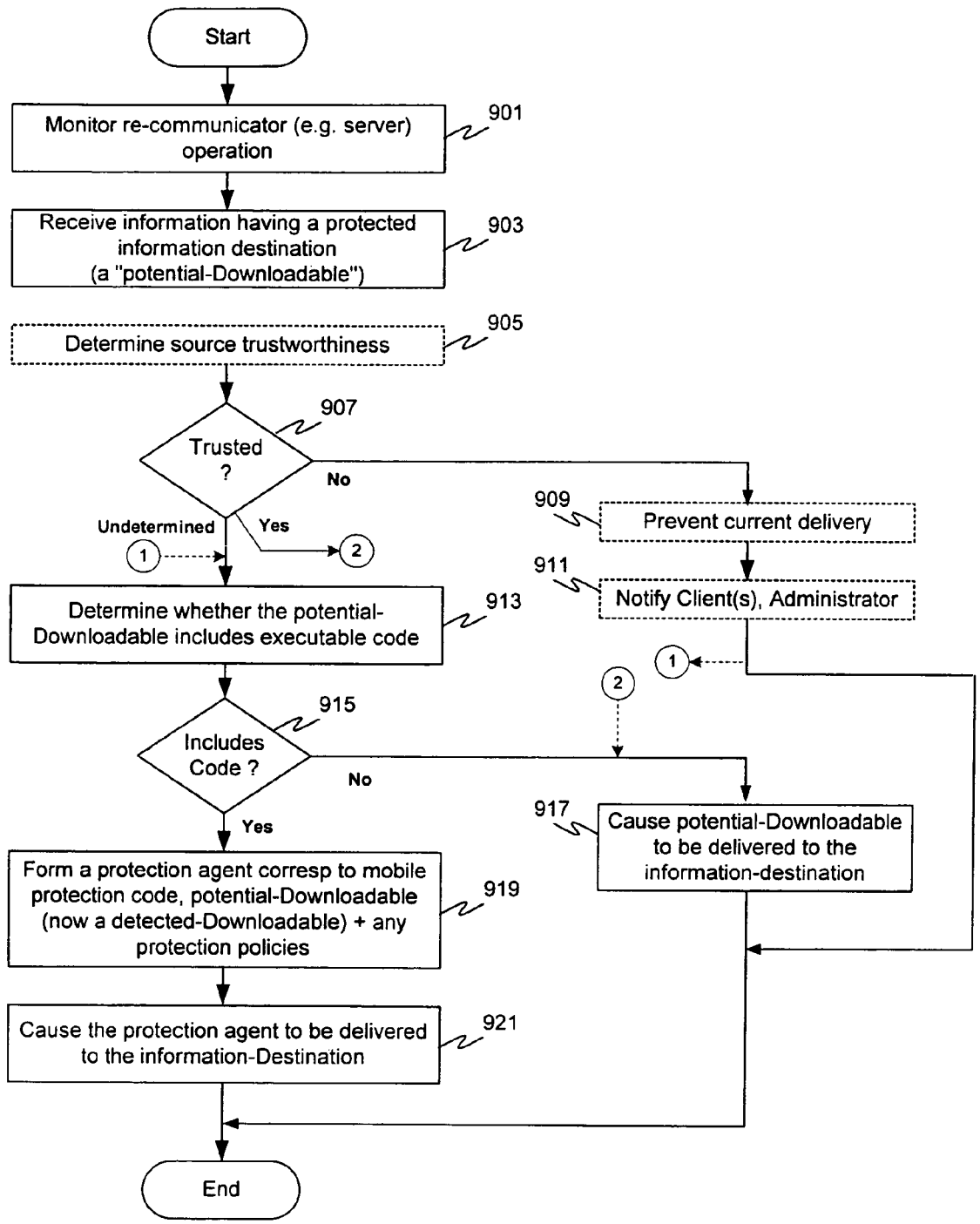
FIG. 9 is a flowchart illustrating a protection method according to an embodiment of the invention.

The FIG. 9 flowchart illustrates a protection method according to an embodiment of the invention. In step 901, a protection engine monitors the receipt, by a server or other re-communicator of information, and receives such information intended for a protected information-destination (i.e. a potential-Downloadable) in step 903. Steps 905-911 depict an adjunct trustworthiness protection that can also be provided, wherein the protection engine determines whether the source of the received information is known to be "unfriendly" and, if so, prevents current (at least unaltered) delivery of the potential-Downloadable and provides any suitable alerts. (The protection engine might also continue to perform Downloadable detection and nevertheless enable delivery or protected delivery of a non-Downloadable, or avoid detection if the source is found to be "trusted", among other alternatives enabled by the teachings herein.)

If, in step 913, the potential-Downloadable source is found to be of an unknown or otherwise suitably authenticated/certified source, then the protection engine determines whether the potential-Downloadable includes executable code in step 915. If the potential-Downloadable does not include executable code, then the protection engine causes the potential-Downloadable to be delivered to the information-destination in its original form in step 917, and the method ends. If instead the potential-Downloadable is found to include executable code in step 915 (and is thus a "detected-Downloadable"), then the protection engine forms a sandboxed package in step 919 and causes the protection agent to be delivered to the information-Destination in step 921, and the method ends. As was discussed earlier, a suitable protection agent can include mobile protection code, policies and the detected-Downloadable (or information corresponding thereto).

Figures 10A, 10B:
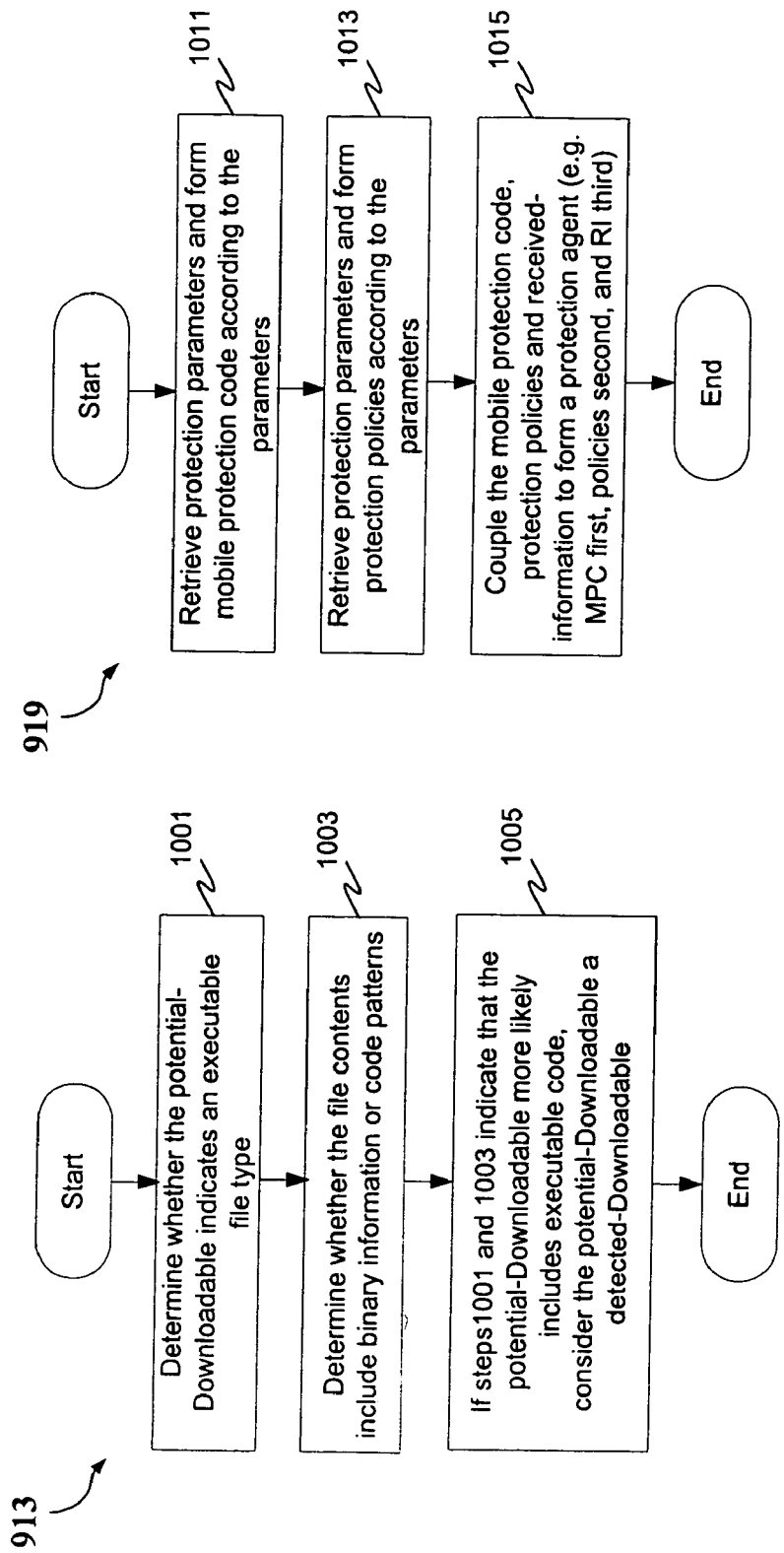
FIG. 10a is a flowchart illustrating method for determining if a potential-Downloadable includes or is likely to include executable code, according to an embodiment of the invention.
FIG. 10b is a flowchart illustrating a method for forming a protection agent, according to an embodiment of the invention.

The FIG. 10*a* flowchart illustrates a method for analyzing a potential-Downloadable, according to an embodiment of the invention. As shown, one or more aspects can provide useful indicators of the inclusion of executable code within the potential-Downloadable. In step 1001, the protection engine determines whether the potential-Downloadable indicates an executable file type, for example, by comparing one or more included file headers for file type indicators (e.g. extensions or other descriptors). The indicators can be compared against all known file types executable by all protected Downloadable destinations, a subset, in accordance with file types executable or desirably executable by the Downloadable-destination, in conjunction with a particular user, in conjunction with available information or operability at the destination, various combinations, etc.

Where content analysis is conducted, in step 1003 of FIG. 10*a*, the protection engine analyzes the potential-Downloadable and determines in accordance therewith whether the potential-Downloadable does or is likely to include binary information, which typically indicates executable code. The protection engine further analyzes the potential-Downloadable for patterns indicative of included executable code in step 1003. Finally, in step 1005, the protection engine determines whether the results of steps 1001 and 1003 indicate that the potential-Downloadable more likely includes executable code (e.g. via weighted comparison of the results with a suitable level indicating the inclusion or exclusion of executable code). The protection engine, given a suitably high confidence indicator of the inclusion of executable code, treats the potential-Downloadable as a detected-Downloadable.

The FIG. 10*b* flowchart illustrates a method for forming a sandboxed package according to an embodiment of the invention. As shown, in step 1011, a protection engine retrieves protection parameters and forms mobile protection code according to the parameters. The protection engine further, in step 1013, retrieves protection parameters and forms protection policies according to the parameters. Finally, in step 1015, the protection engine couples the mobile protection code, protection policies and received-information to form a sandboxed package. For example, where a Downloadable-destination utilizes a standard windows executable, coupling can further be accomplished via concatenating the MPC for delivery of MPC first, policies second, and received-information third. (The protection parameters can, for example, include parameters relating to one or more of the Downloadable destination device/process, user, supervisory constraints or other parameters.)

Figure 11:
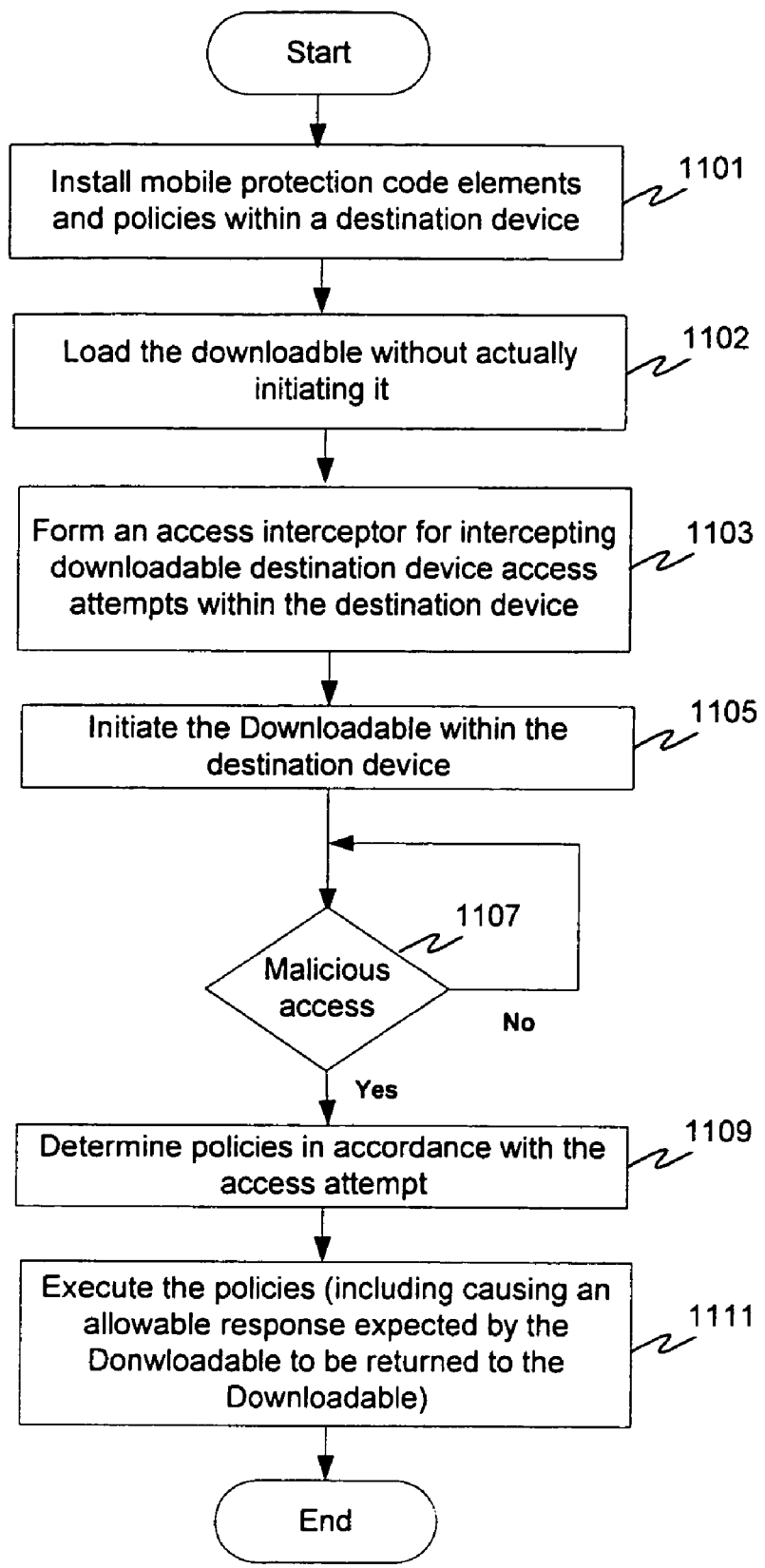
FIG. 11 is a flowchart illustrating a method for protecting a Downloadable destination according to an embodiment of the invention.

The FIG. 11 flowchart illustrates how a protection method performed by mobile protection code ("MPC") according to an embodiment of the invention includes the MPC installing MPC elements and policies within a destination device in step 1101. In step 1102, the MPC loads the Downloadable without actually initiating it (i.e. for executables, it will start a process in suspended mode). The MPC further forms an access monitor or "interceptor" for monitoring or "intercepting" downloadable destination device access attempts within the destination device (according to the protection policies in step 1103, and initiates a corresponding Downloadable within the destination device in step 1105.

If, in step 1107, the MPC determines, from monitored/intercepted information, that the Downloadable is attempting or has attempted a destination device access considered undesirable or otherwise malicious, then the MPC performs steps 1109 and 1111; otherwise the MPC returns to step 1107. In step 1109, the MPC determines protection policies in accordance with the access attempt by the Downloadable, and in step 1111, the MPC executes the protection policies. (Protection policies can, for example, be retrieved from a temporary, e.g. memory/cache, or more persistent storage.)

Figure 12A:
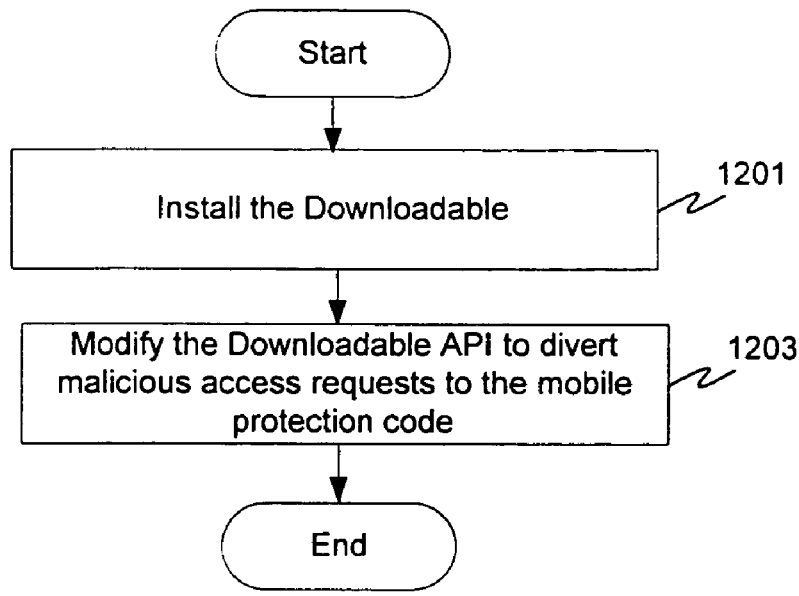
FIG. 12a is a flowchart illustrating a method for forming a Downloadable access interceptor according to an embodiment of the invention.

As shown in the FIG. 12*a* example, the MPC can provide for intercepting Downloadable access attempts by a Downloadable by installing the Downloadable (but not executing it) in step 1201. Such installation will cause a Downloadable executor, such as a the Windows operating system, to provide all required interfaces and parameters (such as the IAT, process ID, etc.) for use by the Downloadable to access device resources of the host device. The MPC can thus cause Downloadable access attempts to be diverted to the MPC by modifying the Downloadable IAT, replacing device resource location indicators with those of the MPC (step 1203).

Figure 12B:
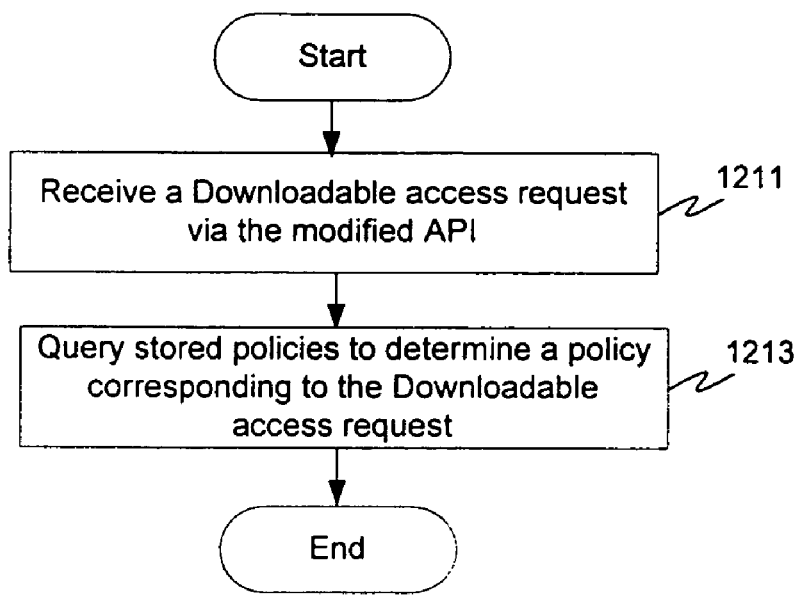
FIG. 12b is a flowchart illustrating a method for implementing mobile protection policies according to an embodiment of the invention.

The FIG. 12*b* example further illustrates an example of how the MPC can apply suitable policies in accordance with an access attempt by a Downloadable. As shown, the MPC receives the Downloadable access request via the modified IAT in step 1211. The MPC further queries stored policies to determine a policy corresponding to the Downloadable access request in step 1213.

The foregoing description of preferred embodiments of the invention is provided by way of example to enable a person skilled in the art to make and use the invention, and in the context of particular applications and requirements thereof. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein. The embodiments described herein are not intended to be exhaustive or limiting. The present invention is limited only by the following claims.

What is claimed is:

1. A computer processor-based method, comprising:
receiving, by a computer, downloadable-information;
determining, by the computer, whether the downloadable-information includes executable code; and
based upon the determination, transmitting from the computer mobile protection code to at least one information-destination of the downloadable-information, if the downloadable-information is determined to include executable code.

2. The method of claim 1, wherein the receiving includes monitoring received information of an information re-communicator.

3. The method of claim 2, wherein the information re-communicator is a network server.

4. The method of claim 1, wherein the determining comprises analyzing the downloadable-information for an included type indicator indicating an executable file type.

5. The method of claim 1, wherein the determining comprises analyzing the downloadable-information for an included type detector indicating an archive file that contains at least one executable.

6. The method of claim 1, wherein the determining comprises analyzing the downloadable-information for an included file type indicator and an information pattern corresponding to one or more information patterns that tend to be included within executable code.

7. The method of claim 1, further comprising receiving, by the computer, one or more executable code characteristics of executable code that is capable of being executed by the information-destination, and wherein the determining is conducted in accordance with the executable code characteristics.

8. A computer processor-based system for computer security, the system comprising
an information monitor for receiving downloadable-information by a computer;
a content inspection engine communicatively coupled to the information monitor for determining, by the computer, whether the downloadable-information includes executable code; and
a protection agent engine communicatively coupled to the content inspection engine for causing mobile protection code ("MPC") to be communicated by the computer to at least one information-destination of the downloadable-information, if the downloadable-information is determined to include executable code.

9. The system of claim 8, wherein the information monitor intercepts received information received by an information re-communicator.

10. The system of claim 9, wherein the information re-communicator is a network server.

11. The system of claim 8, wherein the content inspection engine comprises a file type detector for determining whether the downloadable-information includes a file type indicator indicating an executable file type.

12. The system of claim 8, wherein the content inspection engine comprises a parser for parsing the downloadable-information and a content analyzer communicatively coupled to the parser for determining whether one or more downloadable-information elements of the downloadable-information correspond with executable code elements.

13. A processor-based system for computer security, the system comprising:
means for receiving downloadable-information;
means for determining whether the downloadable-information includes executable code; and
means for causing mobile protection code to be communicated to at least one information-destination of the downloadable-information, if the downloadable-information is determined to include executable code.

14. A computer program product, comprising a computer usable medium having a computer readable program code therein, the computer readable program code adapted to be executed for computer security, the method comprising:
providing a system, wherein the system comprises distinct software modules, and wherein the distinct software modules comprise an information re-communicator and a mobile code executor;
receiving, at the information re-communicator, downloadable-information including executable code; and
causing mobile protection code to be executed by the mobile code executor at a downloadable-information destination such that one or more operations of the executable code at the destination, if attempted, will be processed by the mobile protection code.

15. The method of claim 14, wherein the mobile code executor is a Java Virtual Machine.

16. The method of claim 14, wherein the mobile code executor is the operating system, running native code executables.

17. The method of claim 14, wherein the mobile code executor is a subsystem of the operating system.

18. The method of claim 14, wherein the mobile code executor is a scripting host.

19. The method of claim 14, wherein the re-communicator is at least one of a firewall and a network server.

20. The method claim 14, wherein executing the mobile protection code at the destination causes downloadable interfaces to resources at the destination to be modified such that at least one attempted operation of the executable code is diverted to the mobile protection code.

21. A processor-based system for computer security, the system comprising:
receiving means for receiving, at an information re-communicator of a computer, downloadable-information, including executable code; and
mobile code means communicatively coupled to the receiving means for causing, by the computer, mobile protection code to be executed by a mobile code executor at a downloadable-information destination such that one or more operations of the executable code at the destination, if attempted, will be processed by the mobile protection code.

22. The system of claim 21, wherein the mobile code executor is a Java Virtual Machine.

23. The system of claim 21, wherein the mobile code executor is an operating system, running native code executables.

24. The system of claim 21, wherein the mobile code executor is a subsystem of the windows operating system.

25. The system of claim 21, wherein the mobile code executor is a scripting host.

26. The system of claim 21, wherein the re-communicator is at least one of a firewall and a network server.

27. The system of claim 21, wherein executing the mobile protection code at the destination causes downloadable interfaces to resources at the destination to be modified such that at least one attempted operation of the executable code is diverted to the mobile protection code.

28. A processor-based method, comprising:
receiving a sandboxed package that includes mobile protection code ("MPC") and a Downloadable and one or more protection policies at a computer at a Downloadable-destination;
causing, by the MPC on the computer, one or more operations attempted by the Downloadable to be received by the MPC;
receiving, by the MPC on the computer, an attempted operation of the Downloadable; and
initiating, by the MPC on the computer, a protection policy corresponding to the attempted operation.

29. The method of claim 28, wherein the sandboxed package is configured such that the MPC is executed first, the Downloadable is executed by the MPC and the protection policies are accessible to the MPC.

30. The method of claim 28, wherein the causing comprises modifying, by the MPC, interfaces of a corresponding downloadable to resources at the destination.

31. The method of claim 30, wherein the modifying is accomplished by initiating a loading of the Downloadable, thereby causing a mobile code executor to provide and initialize the interfaces, modifying one or more interface elements to divert corresponding attempted Downloadable operations to the MPC, and initiating execution of the Downloadable.

32. The method of claim 30, wherein the interfaces comprise an import address table ("IAT") of a native code executable downloadable.

33. The method of claim 30, wherein modifying the interfaces installs a filter-driver between the downloadable and the resources.

34. A processor-based system for computer security, the system comprising:
- a mobile code executor on a computer for initiating received mobile code; and
- a sandboxed package capable of being received and initiated by the mobile code executor on the computer, the sandboxed package including a Downloadable and mobile protection code ("MPC") for causing one or more Downloadable operations to be intercepted by the computer and for processing the intercepted operations by the computer, if the Downloadable attempts to initiate the operations.

35. The system of claim 34, wherein the MPC comprises:
- an MPC installer for causing MPC elements to be installed;
- a Downloadable installer communicatively coupled to the MPC installer for installing the Downloadable;
- a resource access diverter communicatively coupled to the MPC installer for causing the Downloadable operations to be intercepted;
- a resource access analyzer communicatively coupled to the MPC installer for receiving an intercepted Downloadable operation and determining a protection policy corresponding to the intercepted Downloadable operation; and
- a policy enforcer communicatively coupled to the resource access analyzer for processing the intercepted Downloadable operation.

36. The system of claim 35, wherein the resource access diverter modifies one or more elements of an interface usable by the Downloadable to effectuate the Downloadable operations.

37. The system of claim 35, wherein the mobile code-executor is a Java Virtual Machine.

38. The system of claim 35, wherein the mobile code executor is an operating system, running native code executables.

39. The system of claim 35, wherein the mobile code executor is a subsystem of the operating system.

40. The system of claim 35, wherein the mobile code executor is a scripting host.

41. A processor-based system for computer security, the system comprising:
- receiving means for receiving a sandboxed package that includes mobile protection code ("MPC") and a Downloadable and one or more protection policies at a Downloadable-destination;
- monitoring means for causing, by the MPC, one or more operations attempted by the Downloadable to be received by the MPC;
- second receiving means receiving, by the MPC, an attempted operation of the Downloadable; and
- initiating means for initiating, by the MPC, a protection policy corresponding to the attempted operation.

* * * * *

UNITED STATES PATENT AND TRADEMARK OFFICE
CERTIFICATE OF CORRECTION

| | | |
|---|---|---|
| PATENT NO. | : 7,647,633 B2 | Page 1 of 1 |
| APPLICATION NO. | : 11/159455 | |
| DATED | : January 12, 2010 | |
| INVENTOR(S) | : Edery et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twenty-eighth Day of December, 2010

David J. Kappos
*Director of the United States Patent and Trademark Office*

(12) EX PARTE REEXAMINATION CERTIFICATE (10873rd)
United States Patent
Edery et al.

(10) Number: US 7,647,633 C1
(45) Certificate Issued: *May 26, 2016

(54) MALICIOUS MOBILE CODE RUNTIME MONITORING SYSTEM AND METHODS

(75) Inventors: Yigal Mordechai Edery, Pardesia (IL); Nimrod Itzhak Vered, Goosh Tal-Moad (IL); David R. Kroll, San Jose, CA (US); Shlomo Touboul, Kefar-Haim (IL)

(73) Assignee: FINJAN, INC., East Palo Alto, CA (US)

Reexamination Request:
No. 90/013,652, Dec. 9, 2015

Reexamination Certificate for:
Patent No.: 7,647,633
Issued: Jan. 12, 2010
Appl. No.: 11/159,455
Filed: Jun. 22, 2005

Certificate of Correction issued Dec. 28, 2010

(*) Notice: This patent is subject to a terminal disclaimer.

Related U.S. Application Data

(63) Continuation of application No. 09/861,229, filed on May 17, 2001, now Pat. No. 7,058,822, and a continuation-in-part of application No. 09/551,302, filed on Apr. 18, 2000, now Pat. No. 6,480,962, and a continuation-in-part of application No. 09/539,667, filed on Mar. 30, 2000, now Pat. No. 6,804,780.

(60) Provisional application No. 60/205,591, filed on May 17, 2000.

(51) Int. Cl.
| | |
|---|---|
| *G06F 11/30* | (2006.01) |
| *G06F 15/16* | (2006.01) |
| *G06F 21/53* | (2013.01) |
| *G06F 21/56* | (2013.01) |
| *H04L 29/06* | (2006.01) |
| *G06F 21/52* | (2013.01) |

(52) U.S. Cl.
CPC ............... *G06F 21/53* (2013.01); *G06F 21/52* (2013.01); *G06F 21/562* (2013.01); *G06F 21/563* (2013.01); *H04L 63/145* (2013.01); *H04L 63/1408* (2013.01); *H04L 63/1441* (2013.01); *H04L 63/20* (2013.01); *G06F 2221/033* (2013.01); *G06F 2221/2119* (2013.01); *G06F 2221/2141* (2013.01)

(58) Field of Classification Search
None
See application file for complete search history.

(56) References Cited

To view the complete listing of prior art documents cited during the proceeding for Reexamination Control Number 90/013,652, please refer to the USPTO's public Patent Application Information Retrieval (PAIR) system under the Display References tab.

*Primary Examiner* — Adam L Basehoar

(57) ABSTRACT

Protection systems and methods provide for protecting one or more personal computers ("PCs") and/or other intermittently or persistently network accessible devices or processes from undersirable or otherwise malicious operations of Java™ applets, ActiveX™ controls, JavaScript™ scripts, Visual Basic Scripts, add-ins, downloaded/uploaded programs or other "Downloadables" or "mobile code" in whole or part. A protection engine embodiment provides, within a server, firewall or other suitable "re-communicator," for monitoring information received by the communicator, determining whether received information does or is likely to include executable code, and if so, causes mobile protection code (MPC) to be transferred to and rendered operable within a destination device of the received information, more suitably by forming a protection agent including the MPC, protection policies and a detected-Downloadable. An MPC embodiment further provides, within a Downloadable-destination, for initiating the Downloadable, enabling malicious Downloadable operation attempts to be received by the MPC, and causing (predetermined) corresponding operations to be executed in response to the attempts, more suitably in conjunction with protection policies.

At the time of issuance and publication of this certificate, the patent remains subject to pending reexamination control number 90/013,016 filed Oct. 7, 2013. The claim content of the patent may be subsequently revised if a reexamination certificate issues from the reexamination proceeding.

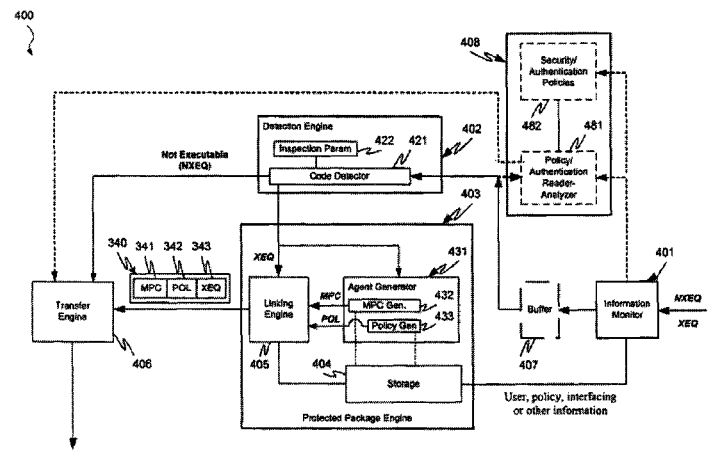

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 8 and 12 is confirmed.

Claims 1-7, 9-11 and 13-41 were not reexamined.

\* \* \* \* \*